US012254839B2

(12) United States Patent
Kim et al.

(10) Patent No.: US 12,254,839 B2
(45) **Date of Patent: *Mar. 18, 2025**

(54) LIGHT-EMITTING DISPLAY DEVICE AND PIXEL THEREOF

(71) Applicant: SAMSUNG DISPLAY CO., LTD., Yongin-si (KR)

(72) Inventors: Hyun Joon Kim, Hwaseong-si (KR); Jun Ki Jeong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,601

(22) Filed: May 8, 2023

(65) Prior Publication Data

US 2023/0274705 A1 Aug. 31, 2023

Related U.S. Application Data

(63) Continuation of application No. 17/675,406, filed on Feb. 18, 2022, now Pat. No. 11,645,980, which is a (Continued)

(30) Foreign Application Priority Data

Apr. 9, 2020 (KR) ........................ 10-2020-0043270

(51) Int. Cl.
*G09G 3/3266* (2016.01)

(52) U.S. Cl.
CPC ... *G09G 3/3266* (2013.01); *G09G 2300/0842* (2013.01); *G09G 2310/0278* (2013.01); (Continued)

(58) Field of Classification Search
CPC ............... G09G 3/3266; G09G 3/3225; G09G 2300/0842; G09G 2310/0278; G09G 2310/061; G09G 2320/0233
See application file for complete search history.

(56) References Cited

U.S. PATENT DOCUMENTS 10,366,651 B2 7/2019 Ha
10,490,128 B1 11/2019 Qian et al.
(Continued)

FOREIGN PATENT DOCUMENTS

CN 107945743 4/2018
CN 110164350 8/2019
(Continued)

OTHER PUBLICATIONS

Notice of Allowance Dated Oct. 14, 2021 In Corresponding U.S. Appl. No. 17/092,495.
(Continued)

*Primary Examiner* — Robert J Michaud
(74) *Attorney, Agent, or Firm* — F. CHAU & ASSOCIATES, LLC

(57) ABSTRACT

A pixel of a light-emitting display device includes a capacitor, a first transistor, a second transistor including a gate receiving a gate writing signal, a third transistor including a gate receiving a scan signal, a fourth transistor including a gate receiving a gate initialization signal, a fifth transistor including a gate receiving a first emission signal, a sixth transistor including a gate receiving a second emission signal, and a light-emitting diode. The scan signal and the gate writing signal may be provided at a first frequency, and the first emission signal, the second emission signal and the gate initialization signal may be provided at a second frequency higher than the first frequency.

20 Claims, 16 Drawing Sheets

Related U.S. Application Data continuation of application No. 17/092,495, filed on Nov. 9, 2020, now Pat. No. 11,257,437.

(52) U.S. Cl.
CPC ................. *G09G 2310/061* (2013.01); *G09G 2320/0233* (2013.01)

(56) References Cited

U.S. PATENT DOCUMENTS

| | | | | |
|---|---|---|---|---|
| 10,922,516 | B2 | 2/2021 | Kim et al. | |
| 11,172,160 | B2 | 11/2021 | Kim et al. | |
| 11,257,437 | B2 | 2/2022 | Kim et al. | |
| 11,393,240 | B2 | 7/2022 | Kim et al. | |
| 11,967,284 | B2 | 4/2024 | Lee et al. | |
| 2017/0140724 | A1 | 5/2017 | Lin et al. | |
| 2018/0151109 | A1 | 5/2018 | Shim et al. | |
| 2018/0174514 | A1* | 6/2018 | Lee | G09G 3/3233 |
| 2019/0051250 | A1* | 2/2019 | Lee | G09G 3/3233 |
| 2019/0057646 | A1 | 2/2019 | Lin et al. | |
| 2019/0237010 | A1 | 8/2019 | Lin et al. | |
| 2020/0105198 | A1 | 4/2020 | Park et al. | |
| 2021/0319755 | A1 | 10/2021 | Kim et al. | |
| 2022/0172682 | A1 | 6/2022 | Kim et al. | |

FOREIGN PATENT DOCUMENTS

| | | |
|---|---|---|
| CN | 110176213 | 8/2019 |
| CN | 110795983 | 2/2020 |
| KR | 10-2017-0065092 | 6/2017 |
| KR | 10-2019-0030060 | 3/2019 |
| WO | WO2020017771 A1 | 1/2020 |

OTHER PUBLICATIONS

Office Action dated Dec. 4, 2020 in corresponding U.S. Appl. No. 17/675,406.

* cited by examiner

LIGHT-EMITTING DISPLAY DEVICE AND PIXEL THEREOF

CROSS-REFERENCE TO RELATED APPLICATION(S)

This U.S. non provisional patent application is a continuation of co-pending U.S. patent application Ser. No. 17/675,406, titled LIGHT-EMITTING DISPLAY DEVICE AND PIXEL THEREOF and filed on Feb. 18, 2022, which, in turn, is a continuation of U.S. patent application Ser. No. 17/092,495, titled LIGHT-EMITTING DISPLAY DEVICE AND PIXEL THEREOF and filed on Nov. 9, 2020, which, in turn, claims priority under 35 USC § 119 to Korean Patent Application No. 10-2020-0043270, filed on Apr. 9, 2020 in the Korean Intellectual Property Office (KIPO), the disclosures of which are incorporated by reference herein in their entireties.

FIELD

The present inventive concept relates to display devices, and more particularly to a light-emitting display device and pixel thereof.

DISCUSSION OF RELATED ART

A display device, such as an organic light-emitting diode (OLED) display device, may display an image at a constant frame rate (or a constant frame frequency) of about 60 Hz, or more. However, a frame rate of rendering process by a host processor (e.g., a graphics processing unit (GPU) and/or a graphics card), providing frame data to the OLED display device, may be different from the frame rate (or a refresh rate) of the OLED display device. In particular, when the host processor provides the OLED display device with frame data for a game image (gaming image), or the like, that requires complicated rendering, the frame rate mismatch may be intensified, and a tearing phenomenon may occur where a boundary line is caused by the frame rate mismatch in an image of the OLED display device.

To prevent or reduce the tearing phenomenon, a variable frame mode (e.g., Free-Sync, G-Sync, or the like) may be used in which a host processor provides frame data to an OLED display device at a variable frame rate (or a variable frame frequency) by changing a time length (or a duration of time) of a blank period in each frame period. An OLED display device supporting the variable frame mode may display an image in synchronization with the variable frame rate, thereby reducing or preventing the tearing phenomenon.

However, in an OLED display device operating in a variable frame mode, even if input image data represent a constant gray level, luminance of the OLED display device might not remain constant as the time length of the blank period is changed.

SUMMARY

An exemplary embodiment provides a pixel of a light-emitting display device having a substantially constant luminance even if a driving frequency is changed.

An exemplary embodiment provides an organic light-emitting diode (OLED) display device capable of having substantially constant luminance even if a driving frequency is changed.

According to an exemplary embodiment, there is provided a pixel of a light-emitting display device including a capacitor having a first electrode coupled to a line of a first power supply voltage, and a second electrode coupled to a gate node, a first transistor having a gate coupled to the gate node, a first terminal, and a second terminal, a second transistor having a gate receiving a gate writing signal, a first terminal coupled to a data line, and a second terminal coupled to the first terminal of the first transistor, a third transistor having a gate receiving a scan signal, a first terminal coupled to the second terminal of the first transistor, and a second terminal coupled to the gate node, a fourth transistor having a gate receiving a gate initialization signal, a first terminal coupled to a line of an initialization voltage, and a second terminal coupled to an anode of a light-emitting diode, a fifth transistor having a gate receiving a first emission signal, a first terminal coupled to the line of the first power supply voltage, and a second terminal coupled to the first terminal of the first transistor, a sixth transistor having a gate receiving a second emission signal, a first terminal coupled to the second terminal of the first transistor, and a second terminal coupled to the anode of the light-emitting diode, and the light-emitting diode having the anode, and a cathode coupled to a line of a second power supply voltage. The scan signal and the gate writing signal are provided at a first frequency, and the first emission signal, the second emission signal and the gate initialization signal are provided at a second frequency higher than the first frequency.

In an exemplary embodiment, the first, second, fourth and fifth transistors may be P-type metal-oxide-semiconductor (PMOS) transistors, and the third and sixth transistors may be N-type metal-oxide-semiconductor (NMOS) transistors.

In an exemplary embodiment, the first, second, fourth, fifth and sixth transistors may be PMOS transistors, and the third transistor may be an NMOS transistor.

In an exemplary embodiment, the second frequency may be a fixed frequency, and the first frequency may be a variable frequency.

In an exemplary embodiment, the light-emitting diode is an organic light-emitting diode (OLED), the light-emitting display device is an OLED display device, the second frequency may correspond to a double of a maximum frequency of a variable input frame frequency of the OLED display device, and the first frequency may correspond to the second frequency divided by N, where N is an integer greater than 1 and less than or equal to the maximum frequency.

In an exemplary embodiment, the light-emitting diode is an organic light-emitting diode (OLED), the light-emitting display device is an OLED display device, a frame period of the OLED display device may include a gate and anode initialization period in which the gate node and the anode are initialized, a data writing period in which a data voltage of the data line is written to the capacitor, a first bias period in which a bias is applied to the first transistor, a first emission period in which the organic light-emitting diode emits light, an anode initialization period in which the anode is initialized, a second bias period in which the bias is applied to the first transistor, and a second emission period in which the organic light-emitting diode emits light.

In an exemplary embodiment, in the gate and anode initialization period, the first emission signal may have an off level, the second emission signal may have an on level, the gate initialization signal may have the on level, the scan signal may have the on level, the gate writing signal may have the off level, the third, fourth and sixth transistors may be turned on, the initialization voltage may be applied to the anode through the fourth transistor, and the initialization voltage may be applied to the gate node through the fourth transistor, the sixth transistor and the third transistor.

In an exemplary embodiment, in the data writing period, the first emission signal may have an off level, the second emission signal may have the off level, the gate initialization signal may have the off level, the scan signal may have an on level, the gate writing signal may have the on level, the second and third transistors may be turned on, the third transistor may diode-connect the first transistor, and the data voltage may be applied to the second electrode of the capacitor through the second transistor and the diode-connected first transistor.

In an exemplary embodiment, in the first bias period, the first emission signal may have an on level, the second emission signal may have an off level, the gate initialization signal may have the off level, the scan signal may have the off level, the gate writing signal may have the off level, the fifth transistor may be turned on, and the first power supply voltage may be applied to the first terminal of the first transistor through the fifth transistor.

In an exemplary embodiment, in each of the first emission period and the second emission period, the first emission signal may have an on level, the second emission signal may have the on level, the gate initialization signal may have an off level, the scan signal may have the off level, the gate writing signal may have the off level, the fifth and sixth transistors may be turned on, and a driving current generated by the first transistor may be provided to the organic light-emitting diode.

In an exemplary embodiment, in the anode initialization period, the first emission signal may have an off level, the second emission signal may have an on level, the gate initialization signal may have the on level, the scan signal may have the off level, the gate writing signal may have the off level, the fourth and sixth transistors may be turned on, and the initialization voltage may be applied to the anode through the fourth transistor.

In an exemplary embodiment, in the second bias period, the first emission signal may have an on level, the second emission signal may have an off level, the gate initialization signal may have the off level, the scan signal may have the off level, the gate writing signal may have the off level, the fifth transistor may be turned on, and the first power supply voltage may be applied to the first terminal of the first transistor through the fifth transistor.

According to an exemplary embodiment, there is provided an OLED display device including a display panel having a plurality of pixels, a scan driver configured to provide a scan signal, a gate writing signal and a gate initialization signal to the plurality of pixels, an emission driver configured to provide a first emission signal and a second emission signal to the plurality of pixels, and a controller configured to control the scan driver and the emission driver. Each of the plurality of pixels includes a capacitor having a first electrode coupled to a line of a first power supply voltage, and a second electrode coupled to a gate node, a first transistor having a gate coupled to the gate node, a first terminal, and a second terminal, a second transistor having a gate receiving the gate writing signal, a first terminal coupled to a data line, and a second terminal coupled to the first terminal of the first transistor, a third transistor having a gate receiving the scan signal, a first terminal coupled to the second terminal of the first transistor, and a second terminal coupled to the gate node, a fourth transistor having a gate receiving the gate initialization signal, a first terminal coupled to a line of an initialization voltage, and a second terminal coupled to an anode of an organic light-emitting diode, a fifth transistor having a gate receiving the first emission signal, a first terminal coupled to the line of the first power supply voltage, and a second terminal coupled to the first terminal of the first transistor, a sixth transistor having a gate receiving the second emission signal, a first terminal coupled to the second terminal of the first transistor, and a second terminal coupled to the anode of the organic light-emitting diode, and the organic light-emitting diode having the anode, and a cathode coupled to a line of a second power supply voltage. The scan driver provides the scan signal and the gate writing signal to the plurality of pixels at a first frequency, and provides the gate initialization signal to the plurality of pixels at a second frequency higher than the first frequency. The emission driver provides the first emission signal and the second emission signal to the plurality of pixels at the second frequency.

In an exemplary embodiment, the OLED display device further includes a data driver configured to provide data voltages to the plurality of pixels. The controller may control the data driver, may provide a scan start pulse and a gate writing start pulse to the scan driver at the first frequency such that the scan signal and the gate writing signal are provided at the first frequency, may provide a gate initialization start pulse to the scan driver at the second frequency such that the gate initialization signal is provided at the second frequency, and may provide a first emission start pulse and a second emission start pulse to the emission driver at the second frequency such that the first emission signal and the second emission signal are provided at the second frequency.

In an exemplary embodiment, within each frame period, the controller may provide one scan start pulse, one gate writing start pulse and at least two gate initialization start pulses to the scan driver, and may provide at least two first emission start pulses and at least two second emission start pulses to the emission driver.

In an exemplary embodiment, the second frequency may be a fixed frequency, and the first frequency may be a variable frequency.

In an exemplary embodiment, the controller may receive input image data at a variable input frame frequency from an external host processor, the second frequency may correspond to a double of a maximum frequency of the variable input frame frequency, and the first frequency may correspond to the second frequency divided by N, where N is an integer greater than 1 and less than or equal to the maximum frequency.

In an exemplary embodiment, the first, second, fourth and fifth transistors may be PMOS transistors, and the third and sixth transistors may be NMOS transistors.

In an exemplary embodiment, the first, second, fourth, fifth and sixth transistors may be PMOS transistors, and the third transistor may be an NMOS transistor.

In an exemplary embodiment, a frame period of the OLED display device may include a gate and anode initialization period in which the gate node and the anode are initialized, a data writing period in which a data voltage of the data line is written to the capacitor, a first bias period in which a bias is applied to the first transistor, a first emission period in which the organic light-emitting diode emits light, an anode initialization period in which the anode is initialized, a second bias period in which the bias is applied to the first transistor, and a second emission period in which the organic light-emitting diode emits light.

According to an exemplary embodiment, a display device includes: a display panel having a plurality of pixels; a scan driver configured to provide a scan signal to the plurality of pixels; and an emission driver configured to provide an emission signal to the plurality of pixels; wherein each of the plurality of pixels includes: a first transistor including a gate coupled to a capacitor, a first terminal, and a second terminal; a second transistor including a gate coupled to the scan driver, a first terminal coupled to a data line, and a second terminal coupled to the first terminal of the first transistor; a third transistor including a gate coupled to the scan driver, a first terminal coupled to the second terminal of the first transistor, and a second terminal coupled to the gate of the first transistor; a fifth transistor including a gate coupled to the emission driver, a first terminal coupled to a first power line, and a second terminal coupled to the first terminal of the first transistor; and a sixth transistor including a gate coupled to the emission driver, a first terminal coupled to the second terminal of the first transistor, and a second terminal coupled to a first terminal of an emission device, wherein the scan driver provides a signal to the plurality of pixels at a first frequency; wherein the emission driver provides a signal to the plurality of pixels at a second frequency greater than the first frequency.

In an exemplary embodiment, the display device may include: a fourth transistor including a gate receiving a signal at the second frequency, a first terminal coupled to a line of an initialization voltage, and a second terminal coupled to the first terminal of the emission device.

In an exemplary embodiment, the first, second, fourth and fifth transistors are PMOS transistors, and at least one of the third or sixth transistors is an NMOS transistor.

In an exemplary embodiment, the second frequency is a fixed frequency, and the first frequency is a variable frequency.

In an exemplary embodiment, the emission device is an organic light-emitting diode (OLED), and the second frequency corresponds to a non-zero multiple of the first frequency.

As described above, in a pixel of an OLED display device and the OLED display device according to an exemplary embodiment, the pixel may include a capacitor, a first transistor, a second transistor having a gate receiving a gate writing signal, a third transistor having a gate receiving a scan signal, a fourth transistor having a gate receiving a gate initialization signal, a fifth transistor having a gate receiving a first emission signal, a sixth transistor having a gate receiving a second emission signal, and an OLED. The scan signal and the gate writing signal may be provided at a first frequency, and the first emission signal, the second emission signal and the gate initialization signal may be provided at a second frequency higher than the first frequency. Accordingly, in the pixel according to an exemplary embodiment, a bias may be applied to the first transistor at the (constant) second frequency, and thus an image may be displayed with substantially constant luminance at the same gray level even if the first frequency (e.g., a driving frequency or a display scan frequency) is changed.

BRIEF DESCRIPTION OF THE DRAWINGS

Illustrative, non-limiting exemplary embodiments will be more clearly understood from the following detailed description taken in conjunction with the accompanying drawings, in which.

DETAILED DESCRIPTION

Hereinafter, embodiments of the present inventive concept will be explained in detail with reference to the accompanying drawings.

Figure 1:
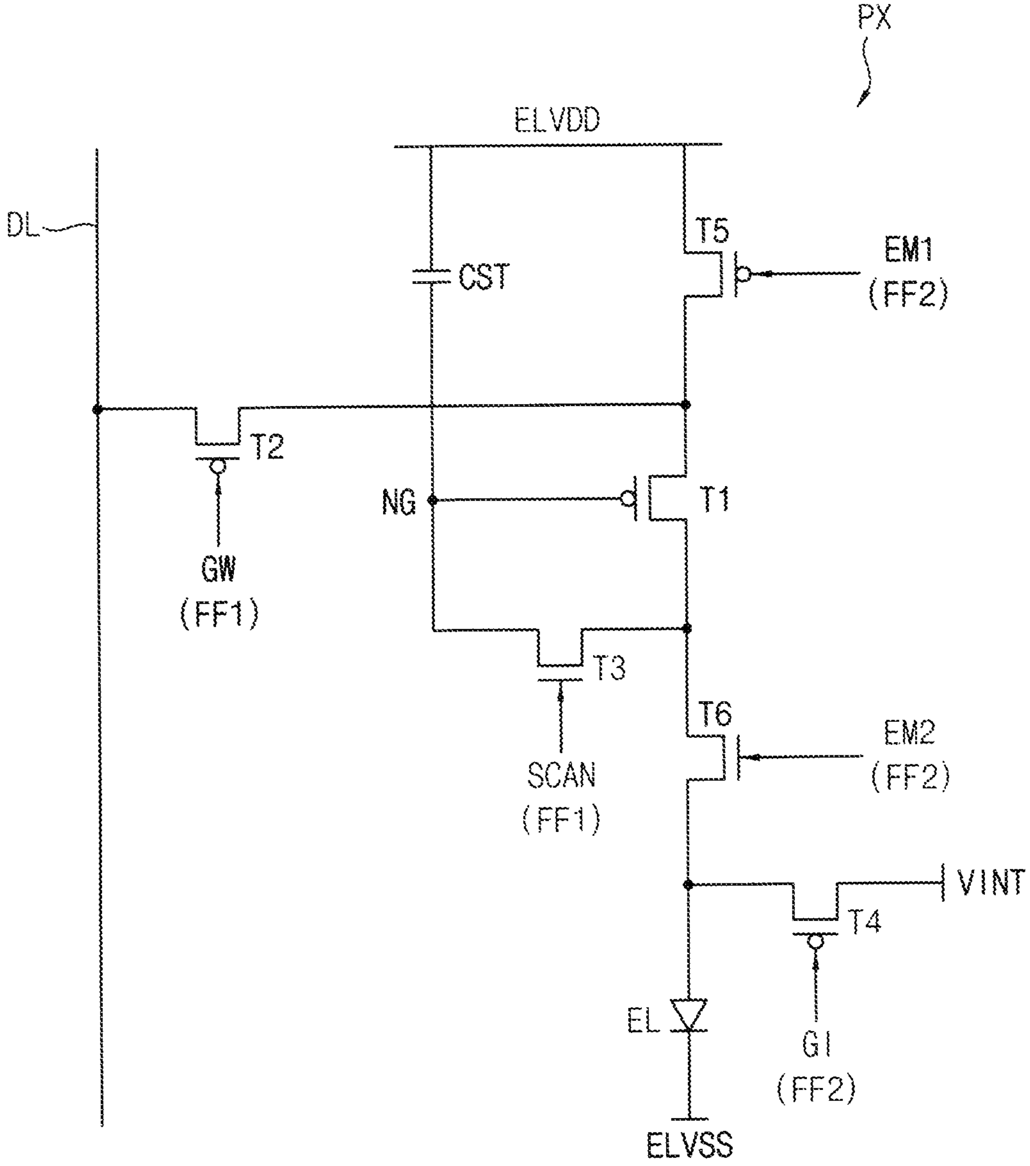
FIG. 1 is a circuit diagram illustrating a pixel of an organic light-emitting diode (OLED) display device according to an exemplary embodiment.
Figure 2:
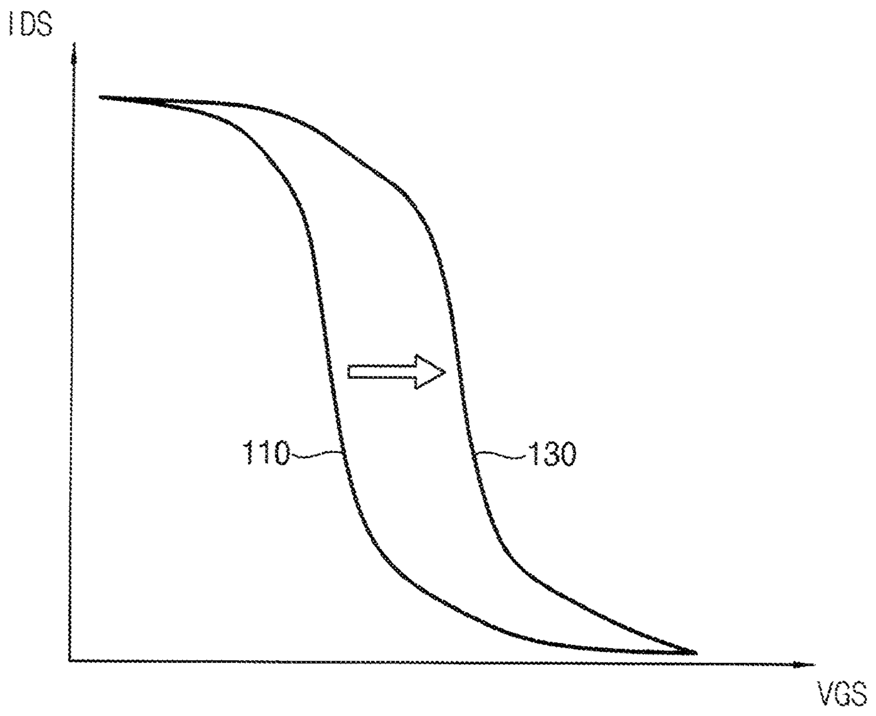
FIG. 2 is a diagram illustrating an example of a driving characteristic of a first transistor.
Figure 3:
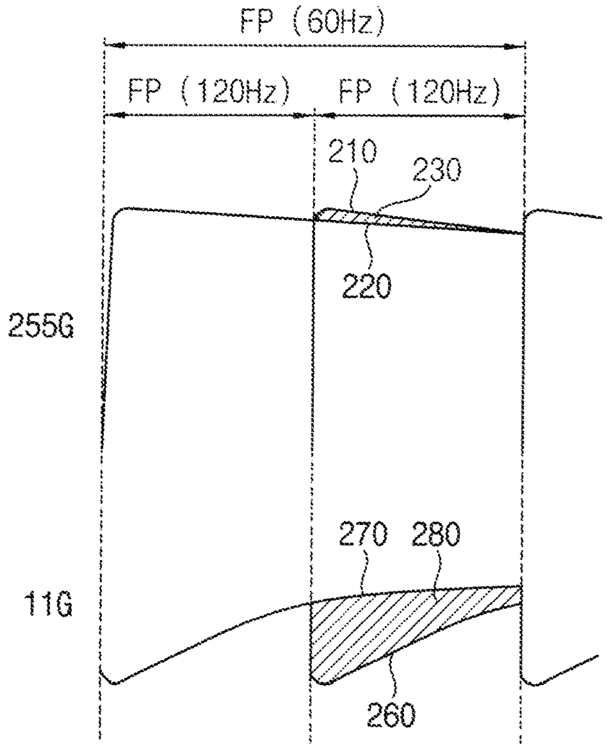
FIG. 3 is a diagram illustrating examples of luminances of display panels driven at different driving frequencies.

FIG. 1 illustrates a pixel of an organic light-emitting diode (OLED) display device according to an exemplary embodiment, FIG. 2 illustrates an example of a driving characteristic of a first transistor, and FIG. 3 illustrates examples of luminances of display panels driven at different driving frequencies.

Referring to FIG. 1, a pixel PX according to an exemplary embodiment may include a capacitor CST, a first transistor T1, a second transistor T2, a third transistor T3, a fourth transistor T4, a fifth transistor T5, a sixth transistor T6, and an organic light-emitting diode EL.

Although an OLED emission device is shown and described, it shall be understood that alternate embodiments may employ alternate emission devices in lieu of and/or in addition to an OLED emission device, such as, for example, an inorganic light-emitting diode emission device. The exemplary embodiments provided herein are provided for ease of understanding, without limitation thereto.

The capacitor CST may store a data voltage transferred through the second transistor T2 and the first transistor T1 that is diode-connected by the third transistor T3. For example, the capacitor CST may be referred to as a storage capacitor for storing the data voltage. In an exemplary embodiment, the capacitor CST may include a first electrode coupled to a line of a first power supply voltage ELVDD, and a second electrode coupled to a gate node NG.

The first transistor T1 may generate a driving current based on a voltage of the gate node NG, or a voltage of the second electrode of the capacitor CST. For example, the first transistor T1 may be referred to as a driving transistor for generating the driving current. In an exemplary embodiment, the first transistor T1 may include a gate coupled to the gate node NG, a first terminal coupled to the second and fifth transistors T2 and T5, and a second terminal coupled to the third and sixth transistors T3 and T6.

The second transistor T2 may transfer the data voltage of a data line DL to the first terminal of the first transistor T1 in response to a gate writing signal GW. For example, the second transistor T2 may be referred to as a switching transistor for transferring the data voltage of the data line DL. In an exemplary embodiment, the second transistor T2 may include a gate receiving the gate writing signal GW, a first terminal coupled to the data line DL, and a second terminal coupled to the first terminal of the first transistor T1.

The third transistor T3 may operate as a diode-connected transistor, such as a metal-oxide semiconductor field-effect transistor (MOSFET) in a saturation region, to diode-connect the first transistor T1 in response to a scan signal SCAN. For example, the third transistor T3 may be referred to as a compensation transistor for compensating a threshold voltage of the first transistor T1. In an exemplary embodiment, the third transistor T3 may include a gate receiving the scan signal SCAN, a first terminal coupled to the second terminal of the first transistor T1, and a second terminal coupled to the gate node NG.

The fourth transistor T4 may apply an initialization voltage VINT to an anode of the organic light-emitting diode EL in response to a gate initialization signal GI. For example, the fourth transistor T4 may be referred to as an initialization transistor for initializing the anode and/or the gate node NG. In an exemplary embodiment, the fourth transistor T4 may include a gate receiving the gate initialization signal GI, a first terminal coupled to a line of the initialization voltage VINT, and a second terminal coupled to the anode of the organic light-emitting diode EL.

The fifth transistor T5 may connect the line of the first power supply voltage ELVDD to the first terminal of the first transistor T1 in response to a first emission signal EM1. For example, the fifth transistor T5 may be referred to as a first emission transistor for generating a current path from the line of the first power supply voltage ELVDD to a line of a second power supply voltage ELVSS. In an exemplary embodiment, the fifth transistor T5 may include a gate receiving the first emission signal EM1, a first terminal coupled to the line of the first power supply voltage ELVDD, and a second terminal coupled to the first terminal of the first transistor T1.

The sixth transistor T6 may connect the second terminal of the first transistor T1 to the line of the second power supply voltage ELVSS in response to a second emission signal EM2. For example, the sixth transistor T6 may be referred to as a second emission transistor for generating the current path from the line of the first power supply voltage ELVDD to the line of the second power supply voltage ELVSS. In an exemplary embodiment, the sixth transistor T6 may include a gate receiving the second emission signal EM2, a first terminal coupled to the second terminal of the first transistor T1, and a second terminal coupled to the anode of the organic light-emitting diode EL.

The organic light-emitting diode EL may emit light based on the driving current generated by the first transistor T1 while the fifth and sixth transistors T5 and T6 are turned on. In an exemplary embodiment, the organic light-emitting diode EL may include the anode coupled to the second terminal of the sixth transistor T6, and a cathode coupled to the line of the second power supply voltage ELVSS.

In an OLED display device supporting a variable frame mode (e.g., a Free-Sync mode, a G-Sync mode, a Q-Sync mode, or the like) in which input image data are provided at a variable input frame frequency (or a variable frame rate), a driving frequency of a display panel including a plurality of pixels PX, or a display scan frequency (or a display refresh rate) at which the data voltages are written to the plurality of pixels PX may be changed according to the variable input frame frequency, and a time length of each frame period may be changed according to the driving frequency (or the display scan frequency). In a case where the driving frequency of the display panel is changed, even if the input image data represent the same gray level, luminance of the pixel PX or the display panel may be reduced (in particular, at a high gray level) by a leakage current of the transistors T1 through T6 of the pixel PX, or, in particular, by a leakage current of the transistors T3 and T6 directly or indirectly connected to the capacitor CST as the time length of each frame period increases. For example, as illustrated in FIG. 3, if the driving frequency of the display panel is changed from about 120 Hz to about 60 Hz, the time length of each frame period may be doubled. In this case, even if the input image data represent the same 255-gray level 255G, luminance 210 of the display panel driven at about 120 Hz and luminance 220 of the display panel driven at about 60 Hz may have a luminance difference 230. That is, the luminance 220 of the display panel driven at about 60 Hz where the time length of each frame period is increased may be reduced compared with the luminance 210 of the display panel driven at about 120 Hz.

However, in the pixel PX of the OLED display device according to an exemplary embodiment as illustrated in FIG. 1, the first, second, fourth and fifth transistors T1, T2, T4 and T5 may be implemented with P-type metal-oxide-semiconductor (PMOS) transistors, and the third and sixth transistors T3 and T6 may be implemented with N-type metal-oxide-semiconductor (NMOS) transistors that have a relatively low leakage current. In this case, since the third and sixth transistors T3 and T6 directly or indirectly connected to the capacitor CST are implemented with the NMOS transistors, a leakage current through the third and sixth transistors T3 and T6 from the capacitor CST may be reduced. Thus, even if the driving frequency of the display panel, or the display scan frequency is changed, the pixel PX or the display panel may display an image with substantially constant luminance at the same gray level. Accordingly, the pixel PX according to an exemplary embodiment may be suitable for the OLED display device supporting the variable frame mode in which the driving frequency of the display panel, or the display scan frequency is changed.

However, even if the third and sixth transistors T3 and T6 are implemented with the NMOS transistors, a driving characteristic of the first transistor T1 (i.e., the driving transistor) may be changed in the case where the driving frequency of the display panel is changed, and thus the luminance of the pixel PX or the display panel may be increased at the same gray level (in particular, at a low gray level) as the time length of each frame period increases. For example, as illustrated in FIG. 2, a bias (e.g., an on-bias) may be applied to the first transistor T1 when a display scan operation that writes the data voltage to the pixel PX is performed in each frame period, and the first transistor T1 may have a first driving characteristic 110 for a drain-source current IDS according to a gate-source voltage VGS initialized by the bias. Thereafter, until the bias is again applied to the first transistor T1 in the next frame period, the driving characteristic of the first transistor T1 may gradually change from the first driving characteristic 110 to a second driving characteristic 130. Due to the change of the driving characteristic of the first transistor T1, the luminance of the pixel PX or the display panel may be changed according to the driving frequency of the display panel. For example, as illustrated in FIG. 3, even if the input image data represent the same 11-gray level 11G, luminance 260 of the display panel driven at about 120 Hz and luminance 270 of the display panel driven at about 60 Hz may have a luminance difference 280. That is, the luminance 270 of the display panel driven at about 60 Hz where the time length of each frame period is increased may be increased compared with the luminance 260 of the display panel driven at about 120 Hz. It shall be understood that this is in contrast to the effect for the higher gray level 255G, described previously, for the luminance 220 of the display panel driven at about 60 Hz that may be reduced, rather than increased, compared with the luminance 210 of the display panel driven at about 120 Hz.

However, in an OLED display device according to an exemplary embodiment, in each frame period, the display scan operation that writes the data voltages to the plurality of pixels PX may be performed once, and a self-scan operation that applies the bias to the first transistors T1 of the plurality of pixels PX may be performed twice or more. In an exemplary embodiment, in each frame period, the display scan operation and the self-scan operation may be substantially simultaneously performed once, and then the self-scan operation may be additionally performed once or more. For example, when the display scan operation and the self-scan operation is substantially simultaneously performed, the gate node NG and the anode of the organic light-emitting diode EL may be initialized, the data voltage may be written to the capacitor CST, and the bias may be applied to the first transistor T1. Further, when the self-scan operation is additionally performed, the anode of the organic light-emitting diode EL may be initialized, and the bias may be applied to the first transistor T1.

To perform the display scan operation once and to perform the self-scan operation twice or more, the scan signal SCAN and the gate writing signal GW may be provided to each pixel PX at a first frequency FF1, and the first emission signal EM1, the second emission signal EM2 and the gate initialization signal GI may be provided to each pixel PX at a second frequency FF2 higher than the first frequency FF1. For example, the first emission signal EM1, the second emission signal EM2, the gate initialization signal GI, the scan signal SCAN and the gate writing signal GW may be provided to each pixel PX such that the display scan operation and the self-scan operation may be substantially simultaneously performed, and then the first emission signal EM1, the second emission signal EM2 and the gate initialization signal GI may be provided to each pixel PX such that the self-scan operation may be additionally performed. Accordingly, the self-scan operation may be performed at the second frequency FF2 higher than the first frequency FF1 that is a frequency of the display scan operation, or the display scan frequency.

In an exemplary embodiment, the first frequency FF1 may be a variable frequency, and the second frequency FF2 may be a fixed frequency. Thus, the first frequency FF1 may be changed according to the variable input frame frequency, but the second frequency FF2 may be substantially constant even if the variable input frame frequency is changed. Accordingly, since the second frequency FF2 that is a frequency of the self-scan operation, or a self-scan frequency is substantially constant even if the first frequency FF1 that is the frequency of the display scan operation, or the display scan frequency is changed, the bias may be applied at the substantially constant second frequency FF2 to the first transistor T1 of each pixel PX, and thus the first transistor T1 of each pixel PX may have a substantially constant driving characteristic at any driving frequency.

In an exemplary embodiment, the second frequency FF2 may correspond to a double of a maximum frequency of the variable input frame frequency, and the first frequency FF1 may be determined as the second frequency FF2 divided by N, where N is an integer greater than 1 and less than or equal to the maximum frequency. For example, in a case where the variable input frame frequency ranges from about 1 Hz to about 120 Hz, the second frequency FF2 may be determined as about 240 Hz that is a double of the maximum frequency of about 120 Hz. Further, the first frequency FF1 may be determined corresponding to the variable input frame frequency in a current frame period among values calculated by diving the second frequency FF2 by N, for example about 120 Hz (in a case where N is 2), about 80 Hz (in a case where N is 3), about 60 Hz (in a case where N is 4), . . . , about 1 Hz (in a case where N is 240), or the like.

As described above, in the pixel PX according to an exemplary embodiment, since the third and sixth transistors T3 and T6 directly or indirectly connected to the capacitor CST are implemented with the NMOS transistors, the leakage current through the third and sixth transistors T3 and T6 from the capacitor CST may be reduced. Further, in the OLED display device including the pixel PX according to an exemplary embodiment, the frequency of the self-scan operation that applies the bias to the first transistor T1 of each pixel PX, or the second frequency FF2 may be the fixed frequency higher than the first frequency FF1. Accordingly, even if the driving frequency of the display panel, or the display scan frequency is changed, the pixel PX and the OLED display device according to an exemplary embodiment may display an image with substantially constant luminance at the same gray level.

In an alternate embodiment, the first through fifth transistors T1, T2, T3', T4 and T5 may be implemented with PMOS transistors, and the sixth transistor T6 may be implemented with an NMOS transistor that has a relatively low leakage current. In this case, since sixth transistor T6 indirectly connected to the capacitor CST is implemented with the NMOS transistor, a leakage current through the sixth transistor T6 from the capacitor CST may be reduced.

Figure 4:
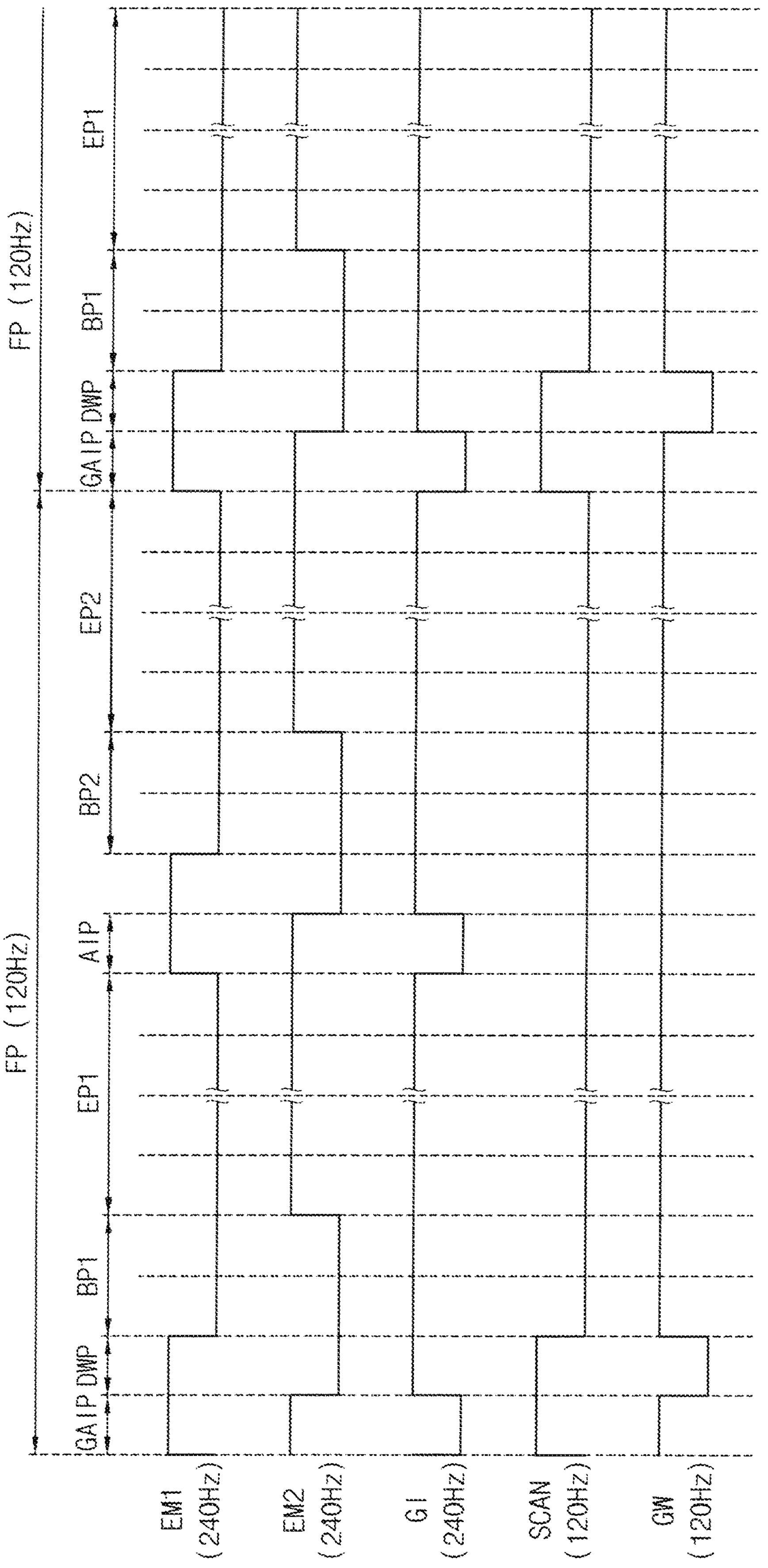
FIG. 4 is a timing diagram for describing an example of an operation of a pixel according to an exemplary embodiment.
Figure 5:
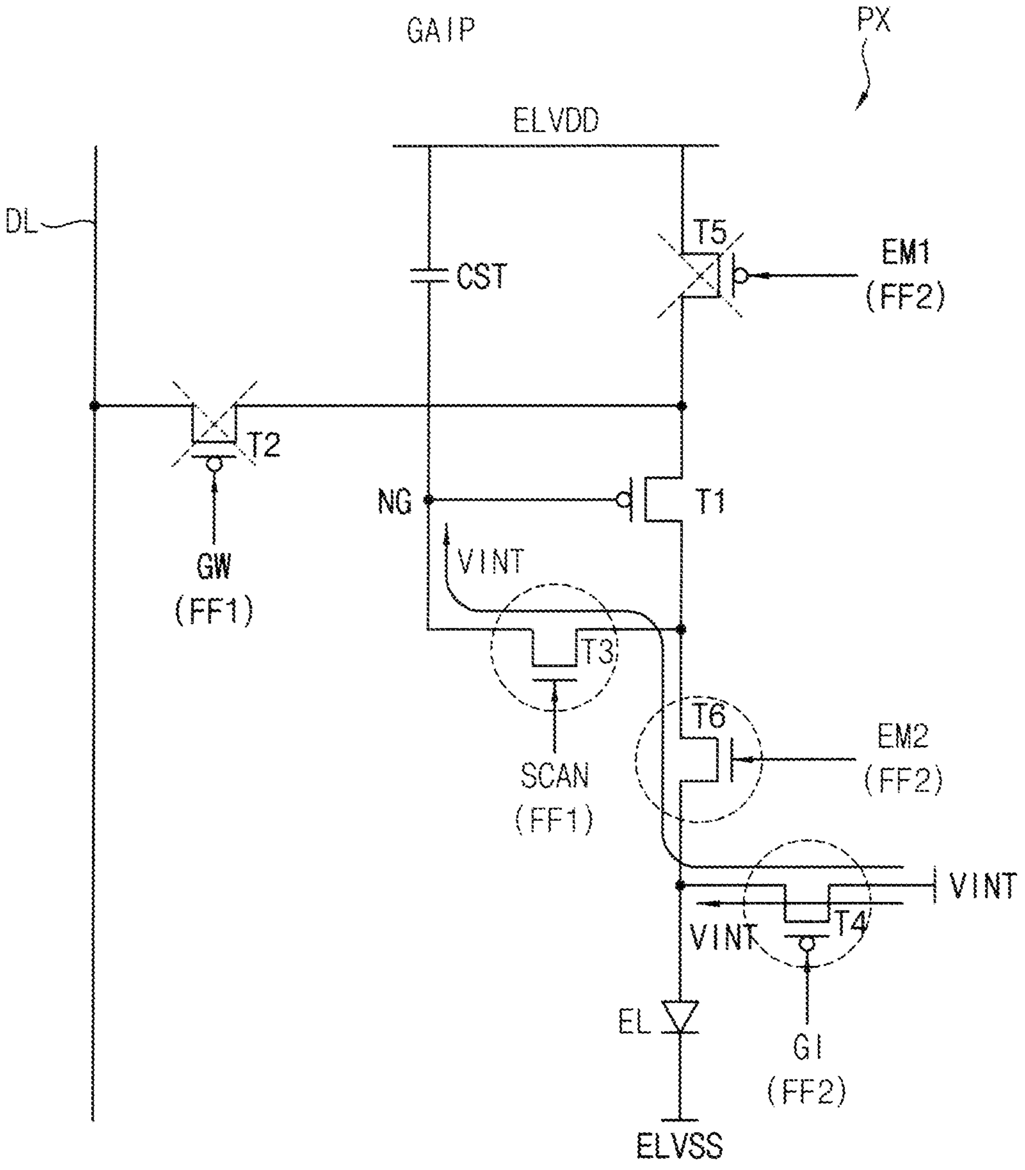
FIG. 5 is a circuit diagram for describing an example of an operation of a pixel in a gate and anode initialization period.
Figure 6:
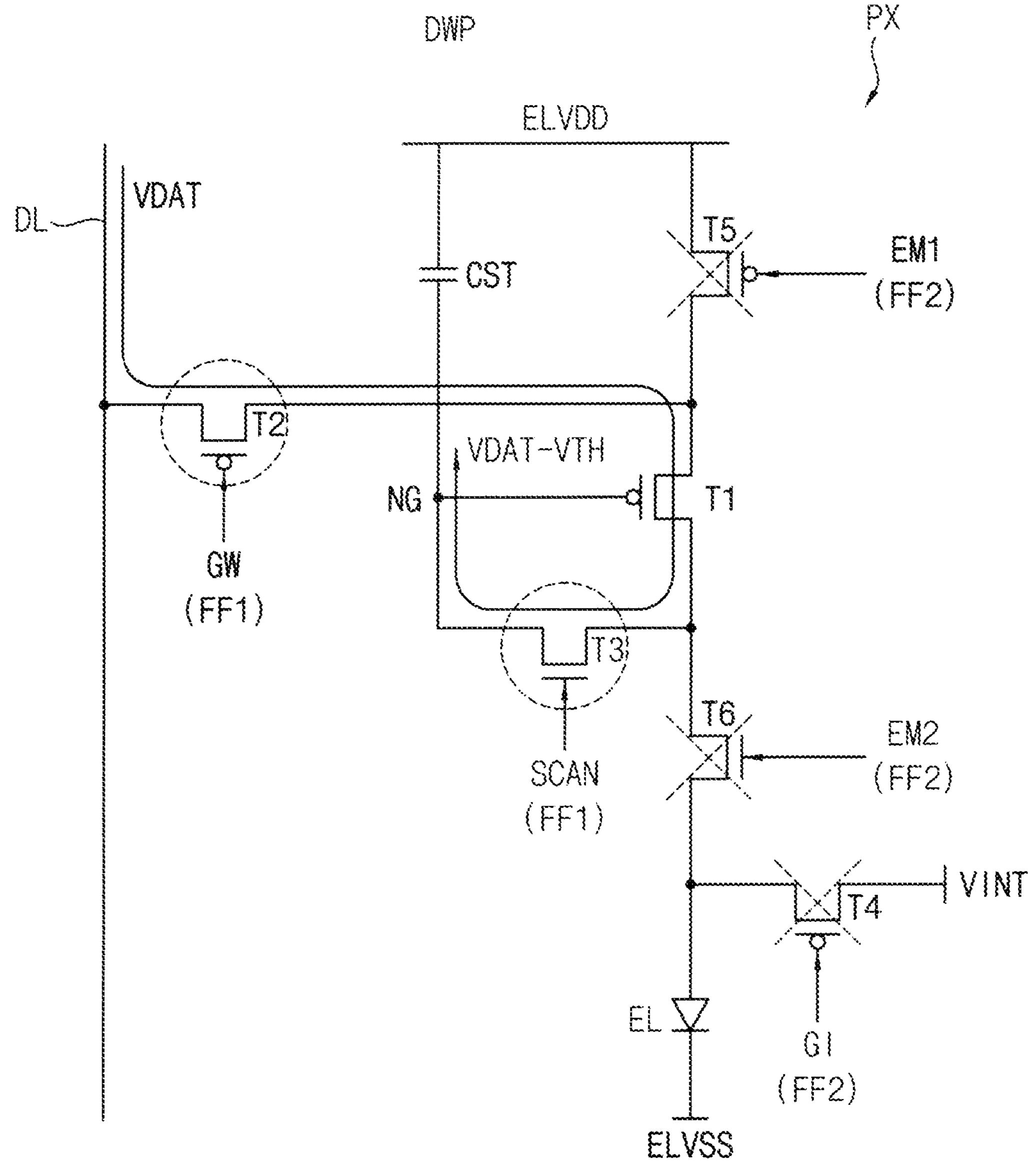
FIG. 6 is a circuit diagram for describing an example of an operation of a pixel in a data writing period.
Figure 7:
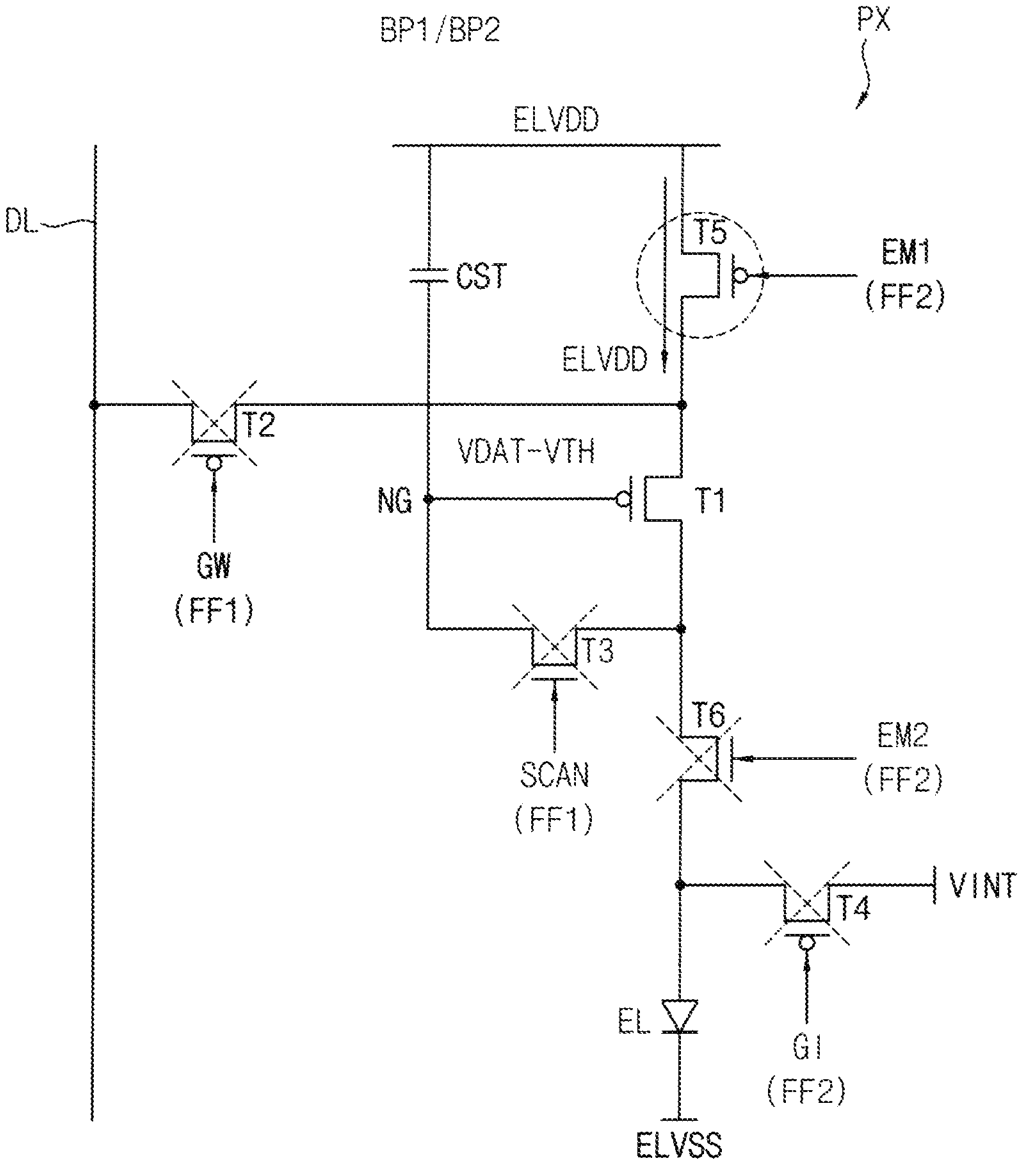
FIG. 7 is a circuit diagram for describing an example of an operation of a pixel in a first bias period or in a second bias period.
Figure 8:
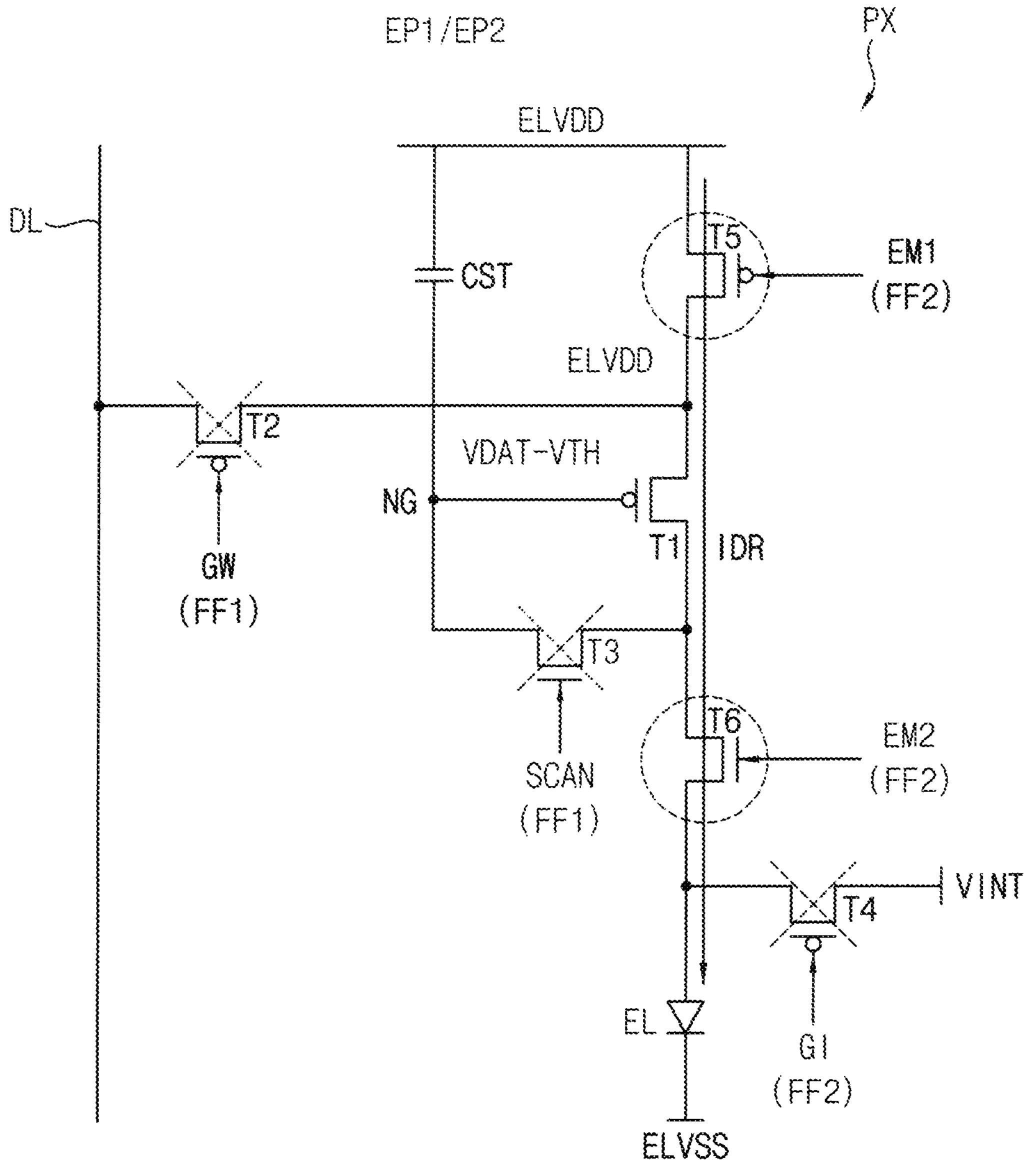
FIG. 8 is a circuit diagram for describing an example of an operation of a pixel in a first emission period or in a second emission period.
Figure 9:
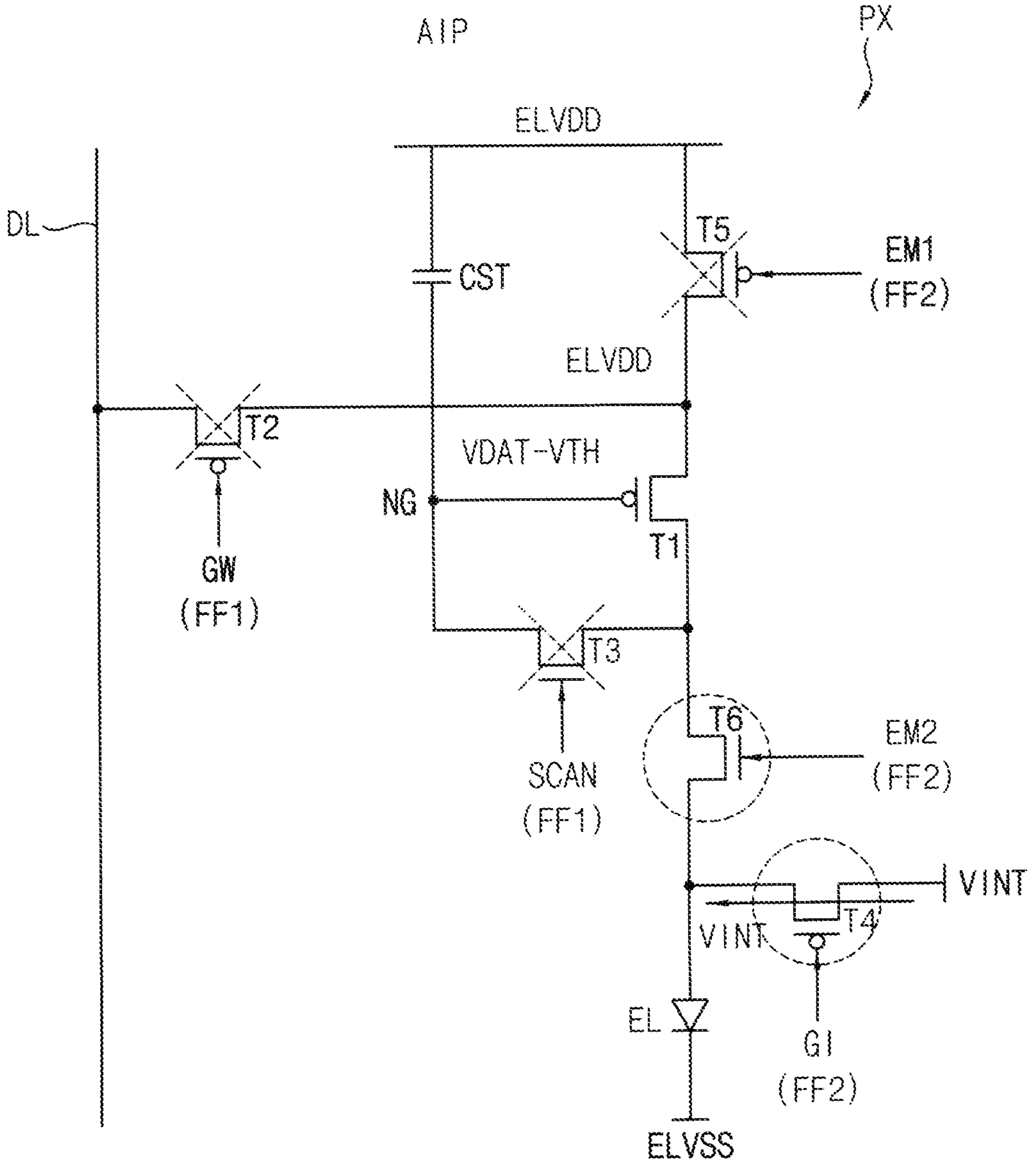
FIG. 9 is a circuit diagram for describing an example of an operation of a pixel in an anode initialization period.
Figure 10:
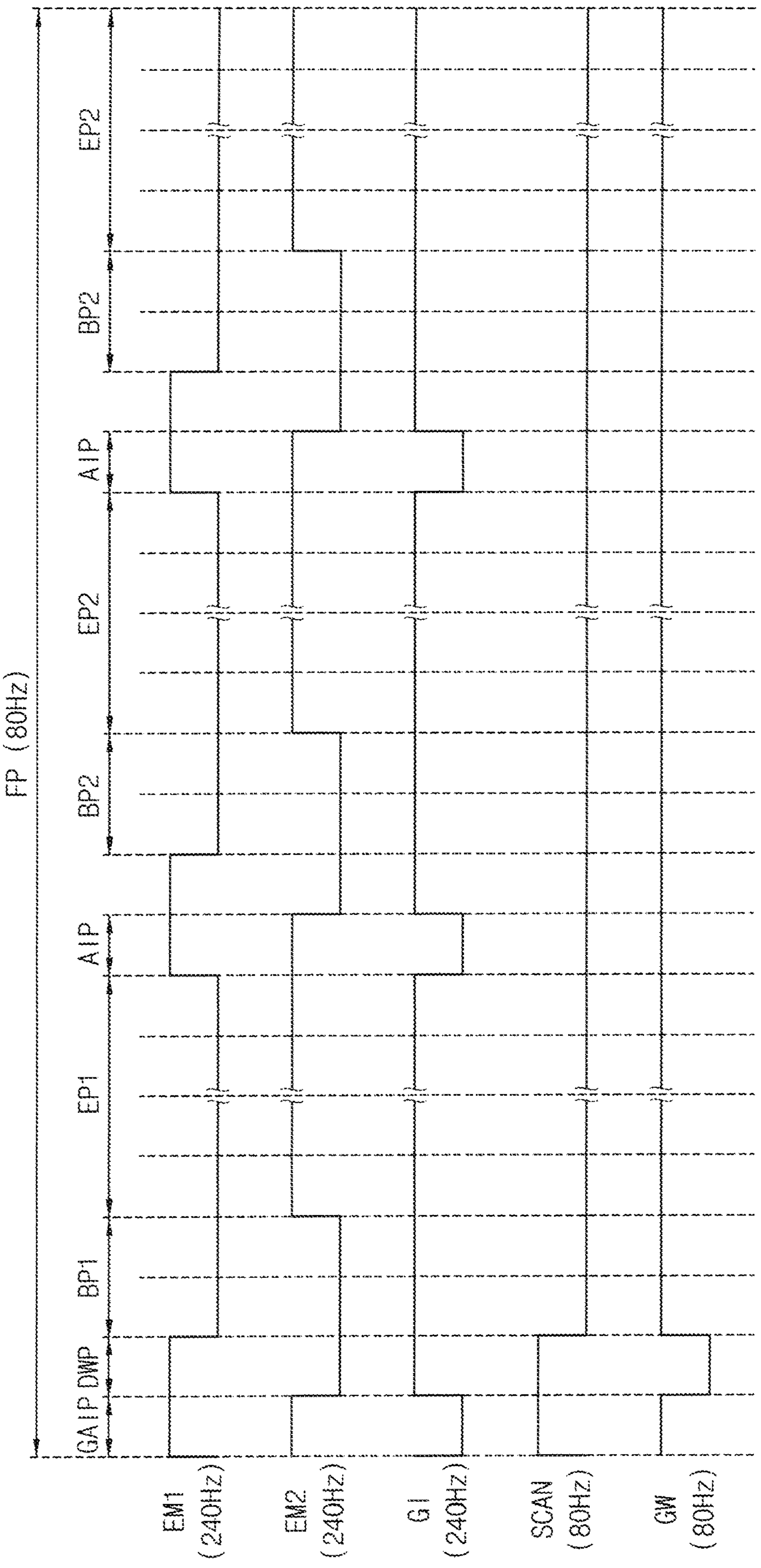
FIG. 10 is a timing diagram for describing another example of an operation of a pixel according to an exemplary embodiment.

FIG. 4 illustrates an example of an operation of a pixel according to an exemplary embodiment, FIG. 5 illustrates an example of an operation of a pixel in a gate and anode initialization period, FIG. 6 illustrates an example of an operation of a pixel in a data writing period, FIG. 7 illustrates an example of an operation of a pixel in a first bias period or in a second bias period, FIG. 8 illustrates an example of an operation of a pixel in a first emission period or in a second emission period, FIG. 9 illustrates an example of an operation of a pixel in an anode initialization period, and FIG. 10 illustrates another example of an operation of a pixel according to an exemplary embodiment.

Referring to FIGS. 1 and 4, a frame period of an OLED display device including a pixel PX according to an exemplary embodiment may include a gate and anode initialization period GAIP, a data writing period DWP, a first bias period BP1, a first emission period EP1, at least one anode initialization period AIP, at least one second bias period BP2 and at least one second emission period EP2. As illustrated in FIG. 4, in a case where a first frequency FF1 that is a driving frequency or a display scan frequency is about 120 Hz, and a second frequency FF2 that is a self-scan frequency is about 240 Hz, the frame period FP may include one anode initialization period AIP, one second bias period BP2 and one second emission period EP2. Further, an operation of the pixel PX in the gate and anode initialization period GAIP, the data writing period DWP and the first bias period BP1 may correspond to a display scan operation and a self-scan operation that are substantially simultaneously performed, and an operation of the pixel PX in the anode initialization period AIP and the second bias period BP2 may correspond to the self-scan operation that is additionally performed.

In the gate and anode initialization period GAIP, a gate node NG and an anode of an organic light-emitting diode EL may be initialized. As illustrated in FIG. 4, in the gate and anode initialization period GAIP, a first emission signal EM1 may have an off level, a second emission signal EM2 may have an on level, a gate initialization signal GI may have the on level, a scan signal SCAN may have the on level, and a gate writing signal GW may have the off level. As illustrated in FIG. 4, at a start time point of the gate and anode initialization period GAIP, the first emission signal EM1, the scan signal SCAN and the gate initialization signal GI may be substantially simultaneously changed to the off level, the on level and the on level, respectively, but time points at which the first emission, scan and gate initialization signals EM1, SCAN and GI are changed may not be limited thereto. For example, unlike as illustrated in FIG. 4, the first emission signal EM1 may be changed to the off level, then the scan signal SCAN may be changed to the on level, and then the gate initialization signal GI may be changed to the on level. In an exemplary embodiment, a time length of the gate and anode initialization period GAIP may correspond to, but not limited to, one horizontal time (1H time). Further, in an exemplary embodiment, the one horizontal time of the OLED display device may be determined based on a maximum frequency of a variable input frame frequency.

In an exemplary embodiment, as illustrated in FIGS. 1 and 4, the first emission signal EM1, the gate initialization signal GI and the gate writing signal GW may be active-low signals having a low level as the on level, and the second emission signal EM2 and the scan signal SCAN may be active-high signals having a high level as the on level. For example, the high level of the first emission signal EM1, the second emission signal EM2, the gate initialization signal GI, the scan signal SCAN and the gate writing signal GW may be, but not limited to, about 7V, and the low level of the first emission signal EM1, the second emission signal EM2, the gate initialization signal GI, the scan signal SCAN and the gate writing signal GW may be, but not limited to, about −8V.

In the gate and anode initialization period GAIP, as illustrated in FIG. 5, a fifth transistor T5 may be turned off in response to the first emission signal EM1 having the off level, a sixth transistor T6 may be turned on in response to the second emission signal EM2 having the on level, a fourth transistor T4 may be turned on in response to the gate initialization signal GI having the on level, a third transistor T3 may be turned on in response to the scan signal SCAN having the on level, and a second transistor T2 may be turned off in response to the gate writing signal GW having the off level. Accordingly, in the gate and anode initialization period GAIP, an initialization voltage VINT may be applied to the anode of the organic light-emitting diode EL through the fourth transistor T4, and thus a voltage of the anode of the organic light-emitting diode EL, or a parasitic capacitor of the organic light-emitting diode EL may be initialized. Further, the initialization voltage VINT may be applied to the gate node NG through the fourth transistor T4, the sixth transistor T6 and the third transistor T3, and thus a voltage of the gate node NG, or a capacitor CST may be initialized.

In the data writing period DWP, a data voltage of a data line DL may be written to the capacitor CST. As illustrated in FIG. 4, in the data writing period DWP, the first emission signal EM1 may have the off level, the second emission signal EM2 may have the off level, the gate initialization signal GI may have the off level, the scan signal SCAN may have the on level, and the gate writing signal GW may have the on level. As illustrated in FIG. 4, at a start time point of the data writing period DWP, the gate initialization signal GI, the second emission signal EM2 and the gate writing signal GW may be substantially simultaneously changed to the off level, the off level and the on level, respectively, but time points at which the gate initialization, second emission and gate writing signals GI, EM2 and GW are changed may not be limited thereto. For example, unlike as illustrated in FIG. 4, the gate initialization signal GI may be changed to the off level, then the second emission signal EM2 may be changed to the off level, and then the gate writing signal GW may be changed to the on level. In an exemplary embodiment, a time length of the data writing period DWP may correspond to, but not limited to, one horizontal time (1H time).

In the data writing period DWP, as illustrated in FIG. 6, the fifth transistor T5 may be turned off in response to the first emission signal EM1 having the off level, the sixth transistor T6 may be turned off in response to the second emission signal EM2 having the off level, the fourth transistor T4 may be turned off in response to the gate initialization signal GI having the off level, the third transistor T3 may be turned on in response to the scan signal SCAN having the on level, and the second transistor T2 may be turned on in response to the gate writing signal GW having the on level. Accordingly, in the data writing period DWP, the third transistor T3 may diode-connect a first transistor T1, and the data voltage VDAT may be applied to the gate node NG, or a second electrode of the capacitor CST through the second transistor T2 and the diode-connected first transistor T1. Since the data voltage VDAT is transferred through the diode-connected first transistor T1, the gate node NG, or the second electrode of the capacitor CST may have a voltage VDAT-VTH where a threshold voltage VTH of the first transistor T1 is subtracted from the data voltage VDAT.

In the first bias period BP1, a bias (e.g., an on-bias) may be applied to the first transistor T1. As illustrated in FIG. 4, in the first bias period BP1, the first emission signal EM1 may have the on level, the second emission signal EM2 may have the off level, the gate initialization signal GI may have the off level, the scan signal SCAN may have the off level, and the gate writing signal GW may have the off level. As illustrated in FIG. 4, at a start time point of the first bias period BP1, the gate writing signal GW, the scan signal SCAN and the first emission signal EM1 may be substantially simultaneously changed to the off level, the off level and the on level, respectively, but time points at which the gate writing, scan and first emission signals GW, SCAN and EM1 are changed may not be limited thereto. For example, unlike as illustrated in FIG. 4, the gate writing signal GW may be changed to the off level, then the scan signal SCAN may be changed to the off level, and then the first emission signal EM1 may be changed to the on level. In an exemplary embodiment, a time length of the data writing period DWP may range, but not limited to, from two horizontal times (2H time) to eight horizontal times (8H time).

In the first bias period BP1, as illustrated in FIG. 7, the fifth transistor T5 may be turned on in response to the first emission signal EM1 having the on level, the sixth transistor T6 may be turned off in response to the second emission signal EM2 having the off level, the fourth transistor T4 may be turned off in response to the gate initialization signal GI having the off level, the third transistor T3 may be turned off in response to the scan signal SCAN having the off level, and the second transistor T2 may be turned off in response to the gate writing signal GW having the off level. Thus, in the first bias period BP1, a first power supply voltage ELVDD may be applied to a first terminal (e.g., a source) of the first transistor T1 through the fifth transistor T5. Accordingly, since the voltage of the gate node NG, or the voltage VDAT-VTH where the threshold voltage VTH is subtracted from the data voltage VDAT is applied to a gate of the first transistor T1, and the first power supply voltage ELVDD is applied to the first terminal (e.g., the source) of the first transistor T1, a bias corresponding to an on-state, or an on-bias using the first power supply voltage ELVDD may be applied to the first transistor T1.

In the first emission period EP1, the organic light-emitting diode EL may emit light. As illustrated in FIG. 4, in the first emission period EP1, the first emission signal EM1 may have the on level, the second emission signal EM2 may have the on level, the gate initialization signal GI may have the on level, the scan signal SCAN may have the off level, and the gate writing signal GW may have the off level.

In the first emission period EP1, as illustrated in FIG. 8, the fifth transistor T5 may be turned on in response to the first emission signal EM1 having the on level, the sixth transistor T6 may be turned on in response to the second emission signal EM2 having the on level, the fourth transistor T4 may be turned off in response to the gate initialization signal GI having the off level, the third transistor T3 may be turned off in response to the scan signal SCAN having the off level, and the second transistor T2 may be turned off in response to the gate writing signal GW having the off level. Thus, in the first emission period EP1, the first transistor T1 may generate a driving current corresponding to the voltage of the gate node NG, or the voltage VDAT-VTH where the threshold voltage VTH is subtracted from the data voltage VDAT, the fifth and sixth transistors T5 and T6 may form a current path from a line of the first power supply voltage ELVDD to a line of a second power supply voltage ELVSS, and the driving current generated by the first transistor T1 may be provided to the organic light-emitting diode EL. Accordingly, the organic light-emitting diode EL may emit light based on the driving current corresponding to the data voltage VDAT.

In the anode initialization period AIP, the anode of the organic light-emitting diode EL may be initialized. As illustrated in FIG. 4, in the anode initialization period AIP, the first emission signal EM1 may have the off level, the second emission signal EM2 may have the on level, the gate initialization signal GI may have the on level, the scan signal SCAN may have the off level, and the gate writing signal GW may have the off level. The scan signal SCAN and the gate writing signal GW may be maintained as the off level during the first bias period BP1, the first emission period EP1, the anode initialization period AIP, the second bias period BP2 and the one second emission period EP2. As illustrated in FIG. 4, at a start time point of the anode initialization period AIP, the first emission signal EM1 and the gate initialization signal GI may be substantially simultaneously changed to the off level and the on level, respectively, but time points at which the first emission and gate initialization signals EM1 and GI are changed may not be limited thereto. For example, unlike as illustrated in FIG. 4, the first emission signal EM1 may be changed to the off level, and then the gate initialization signal GI may be changed to the on level.

In the anode initialization period AIP, as illustrated in FIG. 9, the fifth transistor T5 may be turned off in response to the first emission signal EM1 having the off level, the sixth transistor T6 may be turned on in response to the second emission signal EM2 having the on level, the fourth transistor T4 may be turned on in response to the gate initialization signal GI having the on level, the third transistor T3 may be turned off in response to the scan signal SCAN having the off level, and the second transistor T2 may be turned off in response to the gate writing signal GW having the off level. Thus, in anode initialization period AIP, the initialization voltage VINT may be applied to the anode of the organic light-emitting diode EL through the fourth transistor T4, and thus the voltage of the anode of the organic light-emitting diode EL, or the parasitic capacitor of the organic light-emitting diode EL may be initialized.

In the second bias period BP2, the bias (e.g., the on-bias) may be applied to the first transistor T1. In an exemplary embodiment, a time length of the second bias period BP2 may range, but not limited to, from two horizontal times (2H time) to eight horizontal times (8H time). The first emission signal EM1, the second emission signal EM2, the gate initialization signal GI, the scan signal SCAN and the gate writing signal GW in the second bias period BP2 may be substantially the same as the first emission signal EM1, the second emission signal EM2, the gate initialization signal GI, the scan signal SCAN and the gate writing signal GW in the first bias period BP1, and an operation of the pixel PX in the second bias period BP2 may be substantially the same as an operation of the pixel PX in the first bias period BP1. That is, the voltage of the gate node NG, or the voltage VDAT-VTH where the threshold voltage VTH is subtracted from the data voltage VDAT may be applied to the gate of the first transistor T1, and the first power supply voltage ELVDD may be applied to the first terminal (e.g., the source) of the first transistor T1, and thus the bias corresponding to the on-state, or the on-bias using the first power supply voltage ELVDD may be applied to the first transistor T1. Accordingly, even if the first frequency FF1 that is the driving frequency or the display scan frequency is changed, the bias may be applied to the first transistor T1 at the second frequency FF2 that is the self-scan frequency.

In the second emission period EP2, the organic light-emitting diode EL may emit light. An operation of the pixel PX in the second emission period EP2 may be substantially the same as an operation of the pixel PX in the first emission period EP1. That is, in the second emission period EP2, the organic light-emitting diode EL may emit light based on the driving current corresponding to the data voltage VDAT.

In an exemplary embodiment, the second frequency FF2 may be determined as a fixed frequency (e.g., about 240 Hz) corresponding to a double of the maximum frequency (e.g., about 120 Hz) of the variable input frame frequency, and the first frequency FF1 may be determined as the second frequency divided FF2 by N according to the variable input frame frequency in each frame period, where N is an integer greater than 1 and less than or equal to the maximum frequency. FIG. 4 illustrates an example where N is 2, or an example where the first frequency FF1 is determined as about 120 Hz by dividing the second frequency FF2 of about 240 Hz by 2. Further, FIG. 10 illustrates an example where N is 3, or an example where the first frequency FF1 is determined as about 80 Hz by dividing the second frequency FF2 of about 240 Hz by 3. As illustrated in FIG. 10, in the case where the first frequency FF1 that is the driving frequency or the display scan frequency is about 80 Hz, and the second frequency FF2 that is the self-scan frequency is about 240 Hz, the frame period FP may include two anode initialization periods AIP, two second bias periods BP2 and two second emission periods EP2. As illustrated in FIGS. 4 and 10, even if the first frequency FF1 that is the driving frequency or the display scan frequency is changed, the bias may be applied to the first transistor T1 of each pixel PX at the fixed or constant second frequency FF2 that is the self-scan frequency in the first and second bias periods BP1 and BP2, and the OLED display device may display an image with substantially constant luminance at the same gray level.

Figure 11:
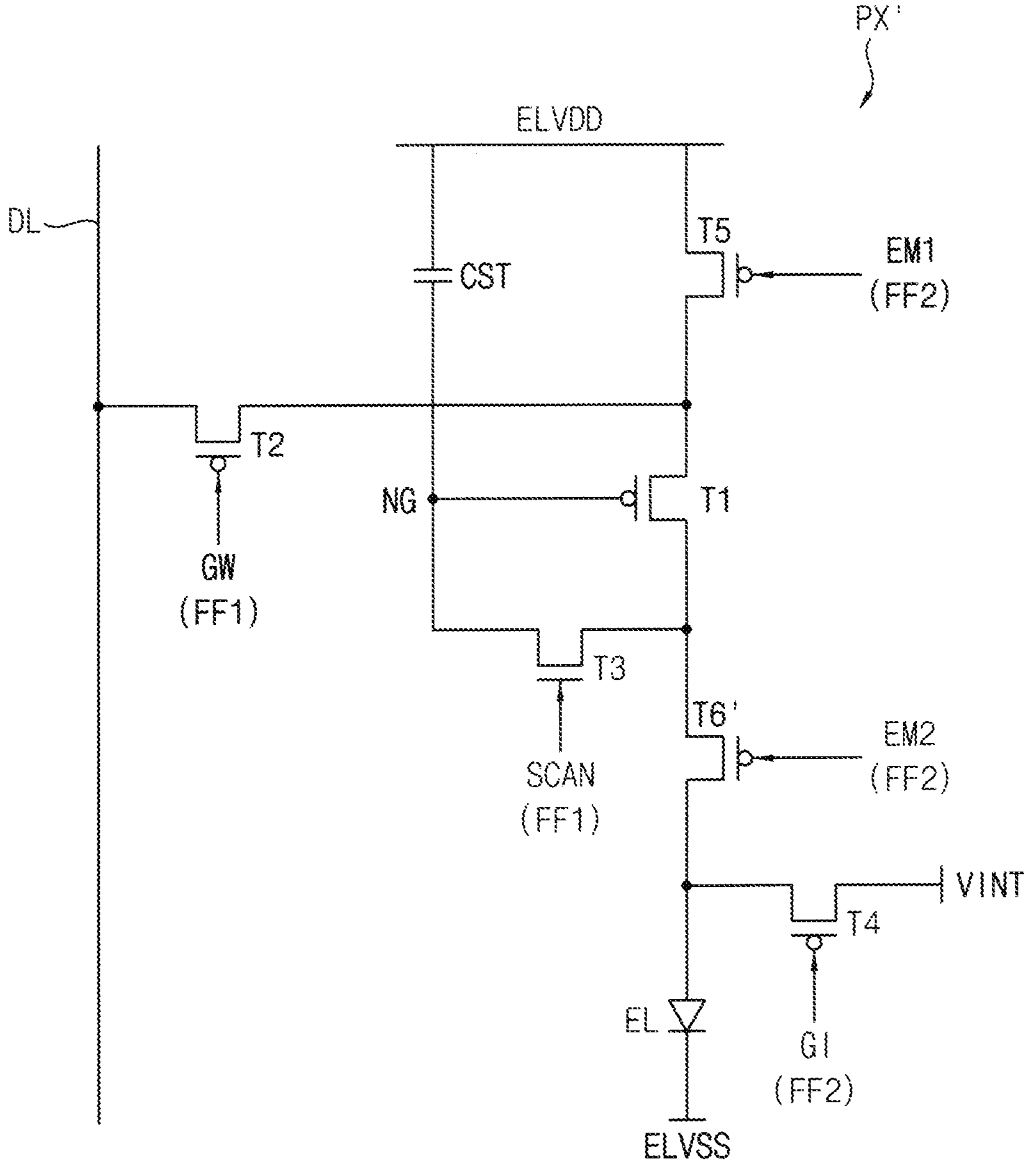
FIG. 11 is a circuit diagram illustrating a pixel of an OLED display device according to an exemplary embodiment.
Figure 12:
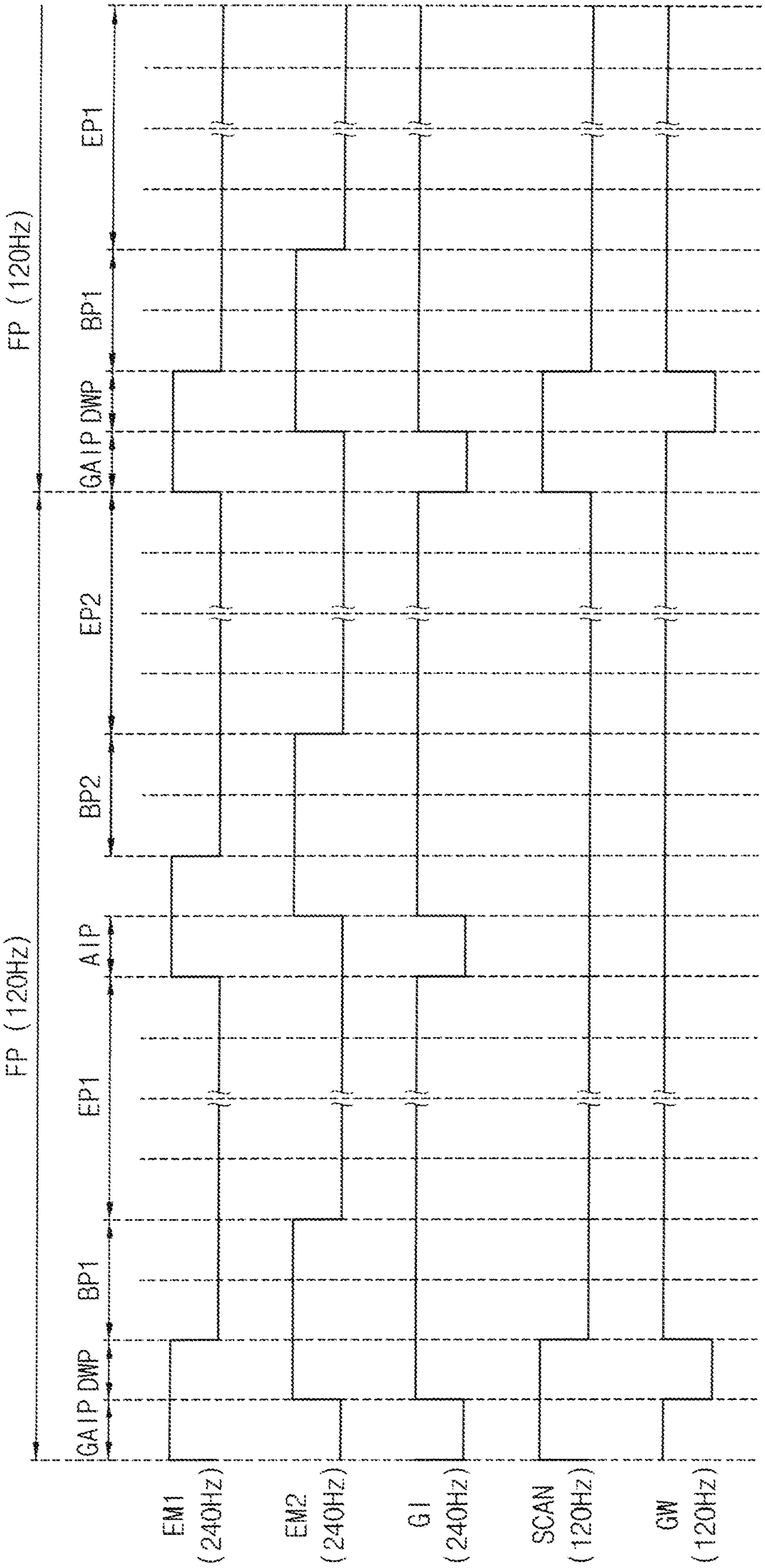
FIG. 12 is a timing diagram for describing an example of an operation of a pixel according to an exemplary embodiment.

FIG. 11 illustrates a pixel of an OLED display device according to an exemplary embodiment, and FIG. 12 illustrates an example of an operation of a pixel according to an exemplary embodiment.

Referring to FIGS. 11 and 12, a pixel PX' according to an exemplary embodiment may include a capacitor CST, a first transistor T1, a second transistor T2, a third transistor T3, a fourth transistor T4, a fifth transistor T5, a sixth transistor T6' and an organic light-emitting diode EL. The pixel PX' of FIG. 11 may have substantially the same configuration as a pixel PX of FIG. 1, except that the sixth transistor T6' is implemented with a PMOS transistor. Further, signals EM1, EM2, GI, SCAN and GW provided to the pixel PX' illustrated in FIG. 12 may be substantially the same as signals EM1, EM2, GI, SCAN and GW provided to the pixel PX illustrated in FIG. 4, except that a second emission signal EM2 is an active-low signal having a low level as an on level.

As illustrated in FIG. 11, the first, second, fourth, fifth and sixth transistors T1, T2, T4, T5 and T6' may be implemented with PMOS transistors, and the third transistor T3 may be implemented with an NMOS transistor that has a relatively low leakage current. In this case, since the third transistor T3 directly connected to the capacitor CST is implemented with the NMOS transistor, a leakage current through the third transistor T3 from the capacitor CST may be reduced. Further, in an OLED display device including the pixel PX' according to an exemplary embodiment, a frequency of a self-scan operation that applies a bias to the first transistor T1 of each pixel PX', or a second frequency FF2 may be a fixed frequency higher than a first frequency FF1. Accordingly, even if a driving frequency of a display panel, or a display scan frequency is changed, the pixel PX' and the OLED display device according to an exemplary embodiment may display an image with substantially constant luminance at the same gray level.

Figure 13:
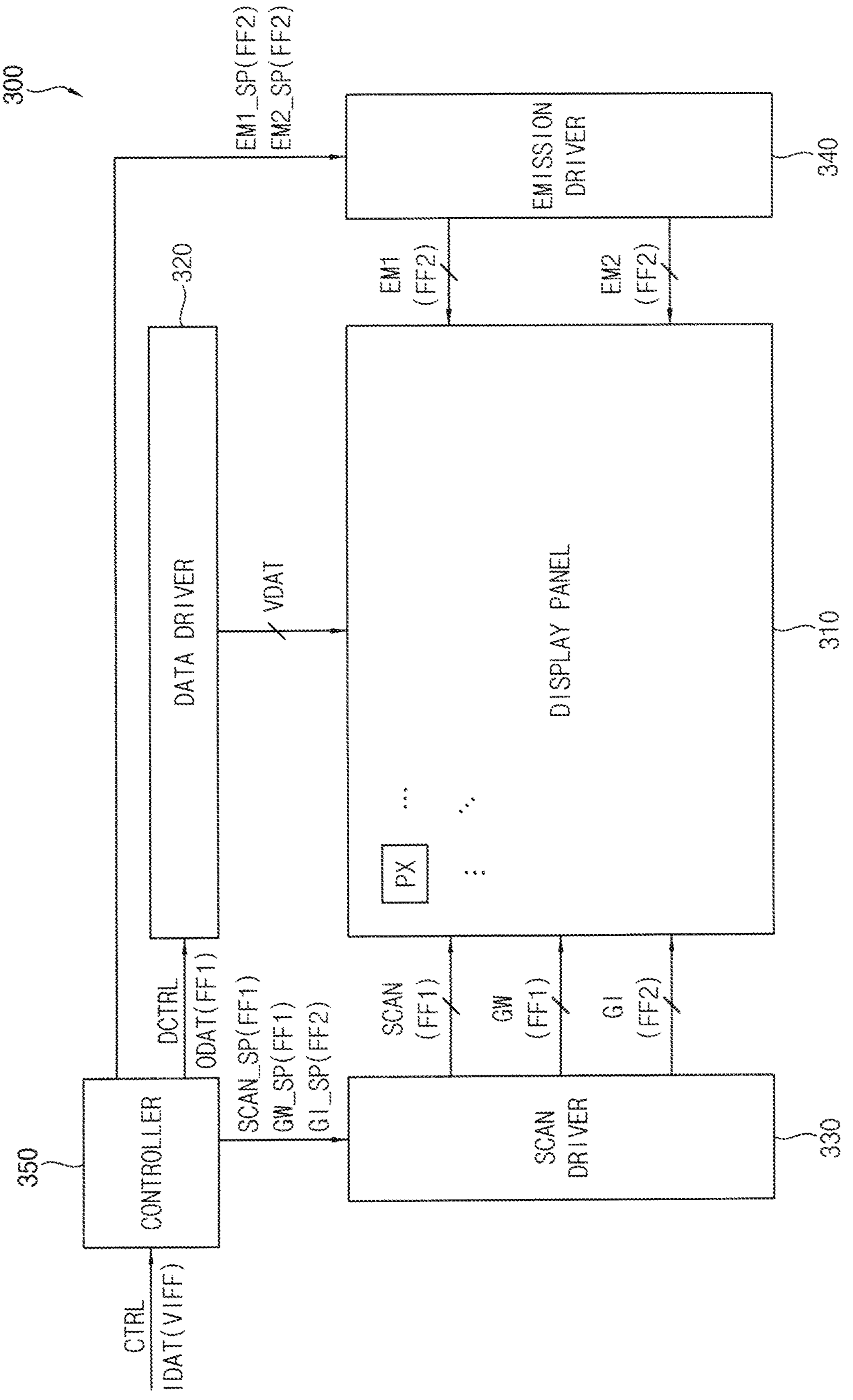
FIG. 13 is a block diagram illustrating an OLED display device according to an exemplary embodiment.
Figure 14:
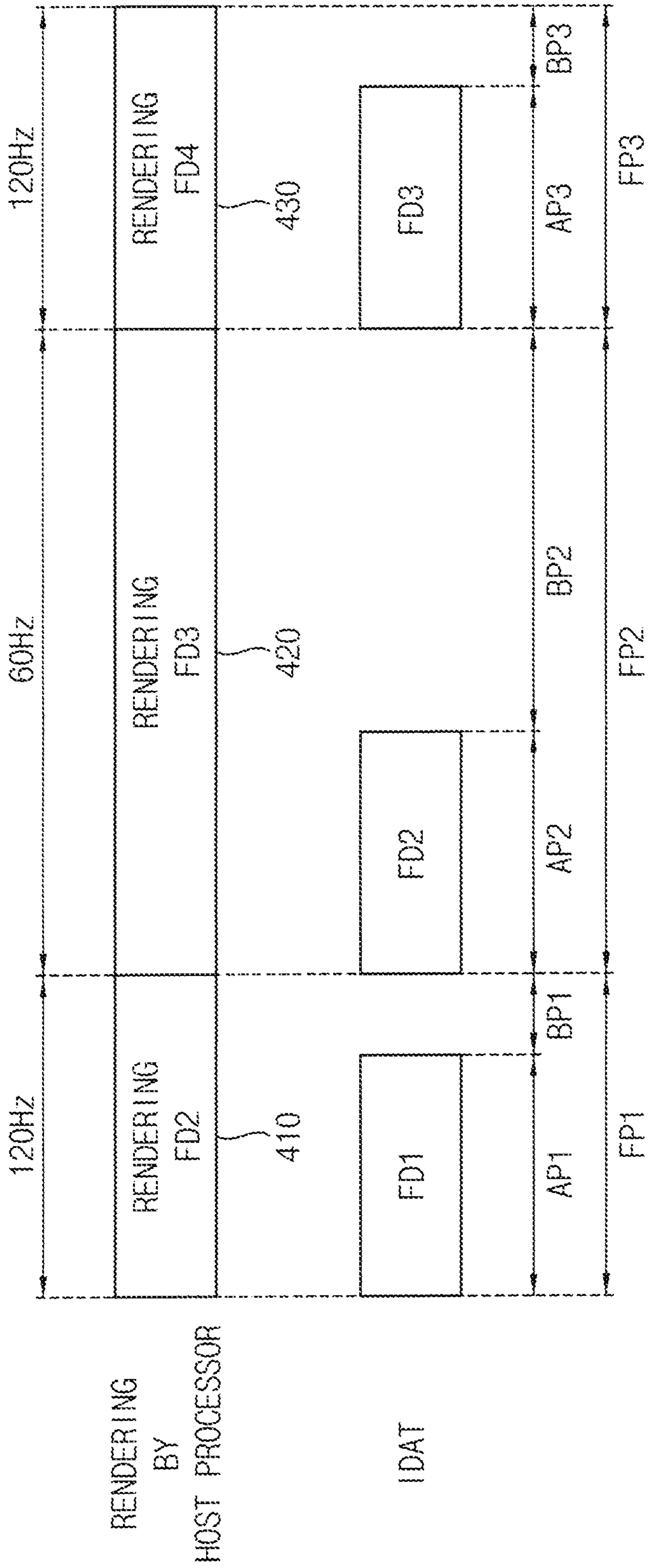
FIG. 14 is a timing diagram for describing an example of input image data provided to an OLED display device according to an exemplary embodiment.
Figure 15:
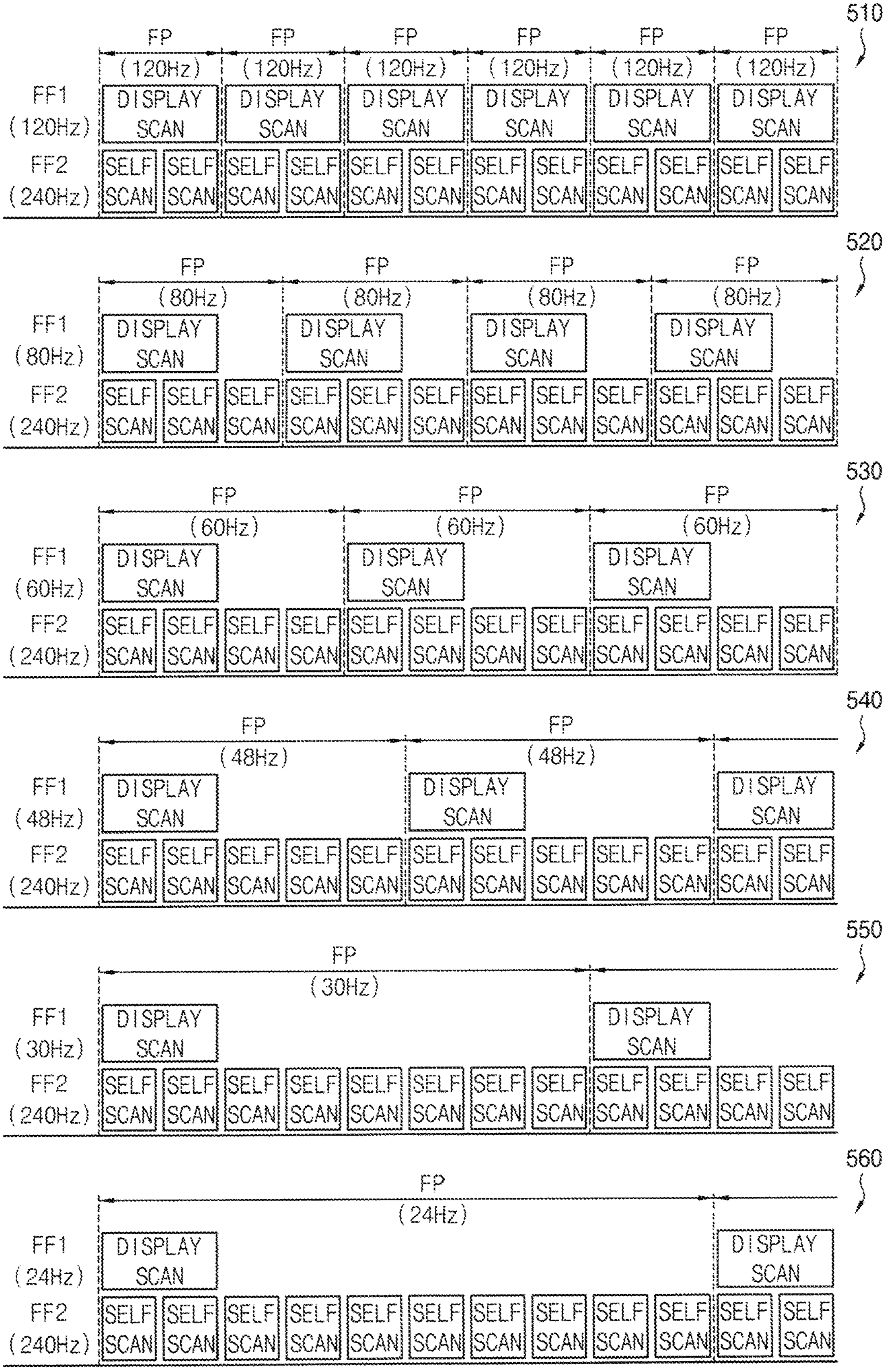
FIG. 15 is a diagram for describing examples of a display scan operation performed at a variable frequency and a self-scan operation performed at a fixed frequency.
Figure 16:
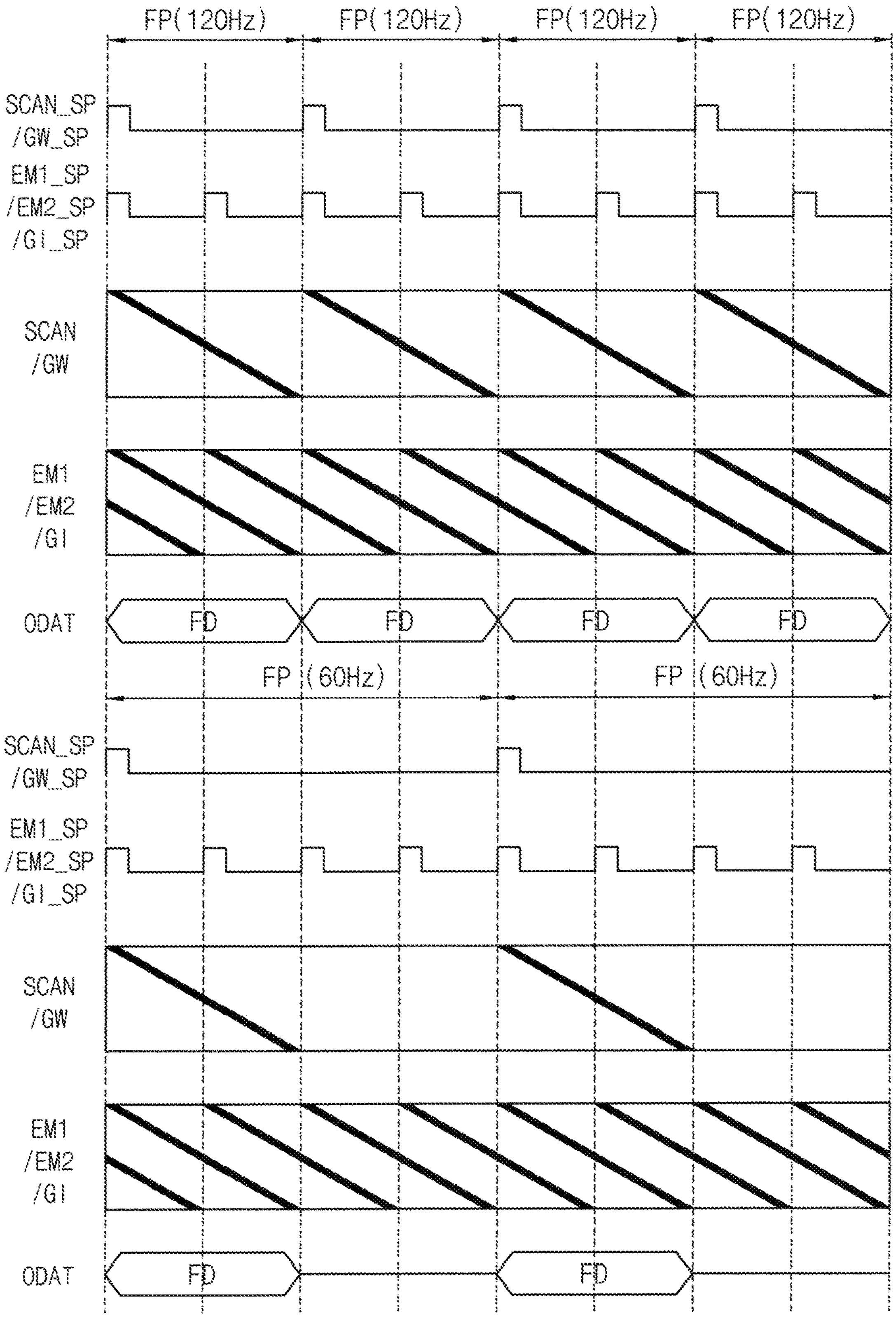
FIG. 16 is a timing diagram for describing examples of operations of an OLED display device where a driving frequency is changed according to an exemplary embodiment.

FIG. 13 illustrates an OLED display device according to an exemplary embodiment, FIG. 14 illustrates an example of input image data provided to an OLED display device according to an exemplary embodiment, FIG. 15 illustrates examples of a display scan operation performed at a variable frequency and a self-scan operation performed at a fixed frequency, and FIG. 16 illustrates examples of operations of an OLED display device where a driving frequency is changed according to an exemplary embodiment.

Referring to FIG. 13, an OLED display device 300 according to an exemplary embodiment may include a display panel 310, a data driver 320, a scan driver 330, an emission driver 340 and a controller 350.

The display panel 310 may include a plurality of pixels PX. Each pixel PX of the display panel 310 may be a pixel PX of FIG. 1, a pixel PX' of FIG. 11, or any other suitable pixel.

The data driver 320 may provide data voltages VDAT to the plurality of pixels PX based on output image data ODAT and a data control signal DCTRL received from the controller 350. In an exemplary embodiment, the data control signal DCTRL may include, but not limited to, an output data enable signal, a horizontal start signal and a load signal. The data driver 320 may receive, as output image data ODAT, frame data at a first frequency FF1 that is a driving frequency of the display panel 310, or a display scan frequency from the controller 350. In an exemplary embodiment, the data driver 320 and the controller 350 may be implemented with a single integrated circuit, and the single integrated circuit may be referred to as a timing controller embedded data driver (TED). In other an exemplary embodiment, the data driver 320 and the controller 350 may be implemented with separate integrated circuits.

The scan driver 330 may provide a scan signal SCAN, a gate writing signal GW and a gate initialization signal GI to the plurality of pixels PX based on a scan control signal received from the controller 350. In an exemplary embodiment, the scan control signal may include a scan start pulse SCAN_SP, a gate writing start pulse GW_SP and a gate initialization start pulse GI_SP. The scan driver 330 may sequentially provide the scan signal SCAN to the plurality of pixels PX on a row-by-row basis in response to the scan start pulse SCAN_SP, may sequentially provide the a gate writing signal GW to the plurality of pixels PX on a row-by-row basis in response to the gate writing start pulse GW_SP, and may sequentially provide the gate initialization signal GI to the plurality of pixels PX on a row-by-row basis in response to the gate initialization start pulse GI_SP. In an exemplary embodiment, the scan driver 330 may receive the scan start pulse SCAN_SP and the gate writing start pulse GW_SP at the first frequency FF1, and may receive the gate initialization start pulse GI_SP at a second frequency FF2 that is a self-scan frequency. Further, in an exemplary embodiment, the scan control signal may further include, but not limited to, a scan clock signal, a gate writing clock signal and a gate initialization clock signal. In an exemplary embodiment, the scan driver 330 may be integrated or formed in a peripheral portion of the display panel 310. In other an exemplary embodiment, the scan driver 330 may be implemented with one or more integrated circuits.

The emission driver 340 may provide a first emission signal EM1 and a second emission signal EM2 to the plurality of pixels PX based on an emission control signal received from the controller 350. The emission control signal may include a first emission start pulse EM1_SP and a second emission start pulse EM2_SP. The emission driver 340 may sequentially provide the first emission signal EM1 to the plurality of pixels PX on a row-by-row basis in response to the first emission start pulse EM1_SP, and may sequentially provide the second emission signal EM2 to the plurality of pixels PX on a row-by-row basis in response to the second emission start pulse EM2_SP. In an exemplary embodiment, the emission driver 340 may receive the first emission start pulse EM1_SP and the second emission start pulse EM2_SP at the second frequency FF2. Further, in an exemplary embodiment, the emission control signal may further include, but not limited to, a first emission clock signal and a second emission clock signal. In an exemplary embodiment, the emission driver 340 may be integrated or formed in the peripheral portion of the display panel 310. In other an exemplary embodiment, the emission driver 340 may be implemented with one or more integrated circuits.

The controller 350 (e.g., a timing controller) may receive input image data IDAT and a control signal CTRL from an external host processor (e.g., a graphic processing unit (GPU), an application processor (AP) or a graphic card). In an exemplary embodiment, the input image data IDAT may be RGB image data including red image data, green image data and blue image data. In an exemplary embodiment, the control signal CTRL may include, but not limited to, a vertical synchronization signal, a horizontal synchronization signal, an input data enable signal, a master clock signal, or the like The controller 350 may generate the output image data ODAT, the data control signal DCTRL, the scan control signal and the emission control signal based on the input image data IDAT and the control signal CTRL. The controller 350 may control an operation of the data driver 320 by providing the output image data ODAT and the data control signal DCTRL to the data driver 320, may control an operation of the scan driver 330 by providing the scan control signal to the scan driver 330, and may control an operation of the emission driver 340 by providing the emission control signal to the emission driver 340.

According to an exemplary embodiment, a display device 300 includes: a display panel 310 having a plurality of pixels PX; a scan driver 330 configured to provide a scan signal to the plurality of pixels; and an emission driver 340 configured to provide an emission signal to the plurality of pixels; wherein each of the plurality of pixels includes: a capacitor Cst including a first electrode coupled to a first power line ELVDD, and a second electrode; a first transistor T1 including a gate coupled to the second electrode of the capacitor, a first terminal, and a second terminal; a second transistor T2 including a gate coupled to the scan driver, a first terminal coupled to a data line DL, and a second terminal coupled to the first terminal of the first transistor; a third transistor including a gate coupled to the scan driver, a first terminal coupled to the second terminal of the first transistor, and a second terminal coupled to the gate of the first transistor; a fifth transistor including a gate coupled to the emission driver, a first terminal coupled to the first power line, and a second terminal coupled to the first terminal of the first transistor; and a sixth transistor including a gate coupled to the emission driver, a first terminal coupled to the second terminal of the first transistor, and a second terminal coupled to a first terminal of an emission device EL, wherein the scan driver provides a signal to the plurality of pixels at a first frequency FF1; wherein the emission driver provides a signal to the plurality of pixels at a second frequency FF2 greater than the first frequency.

In an exemplary embodiment, the display device may include: a fourth transistor T4 including a gate receiving a signal at the second frequency FF2, a first terminal coupled to a line of an initialization voltage Vint, and a second terminal coupled to the first terminal of the emission device. The first, second, fourth and fifth transistors may be PMOS transistors, and at least one of the third or sixth transistors may be an NMOS transistor. The second frequency may be a fixed frequency, and the first frequency may be a variable frequency. The emission device may be an OLED, and the second frequency may correspond to a non-zero multiple of the first frequency.

The controller 350 of the OLED display device 300 according to an exemplary embodiment may receive the input image data DAT at a variable input frame frequency VIFF from the host processor in a variable frame mode (e.g., a Free-Sync mode, a G-Sync mode, a Q-Sync mode, or the like). For example, as illustrated in FIG. 14, a period of each of renderings 410, 420 and 430 by the host processor may not be constant (in particular, in a case where game image data are rendered), and the host processor may provide the input image data IDAT, or frame data FD1, FD2, FD3 and FD4 to the OLED display device 300 in synchronization with, respectively, these irregular periods of renderings 410, 420 and 430 in the variable frame mode. For example, in the variable frame mode, each frame period FP1, FP2 and FP3 may include a constant active period AP1, AP2 and AP3 having a constant time length, and the host processor may provide the frame data FD1, FD2 and FD3 to the OLED display device 300 at the variable input frame frequency VIFF by changing a time length of a variable blank period BP1, BP2 and BP3 of the frame period FP1, FP2 and FP3. For example, the variable input frame frequency VIFF may be changed within a range from about 1 Hz to about 120 Hz in each frame period FP1, FP2 and FP3.

In an exemplary embodiment, the second frequency FF2 that is the self-scan frequency may be a fixed frequency (e.g., about 240 Hz) corresponding to a double of a maximum frequency (e.g., about 120 Hz) of the variable input frame frequency VIFF. Further, the first frequency FF1 that is the driving frequency of the display panel 310, or the display scan frequency may be determined as the second frequency FF2 divided by N according to the variable input frame frequency VIFF in each frame period, where N is an integer greater than 1 and less than or equal to the maximum frequency. Thus, the OLED display device 300 according to an exemplary embodiment may perform a display scan operation that writes the data voltages VDAT corresponding to the output image data ODAT to the plurality of pixels PX at the first frequency FF1 that is the variable frequency, and may perform a self-scan operation that applies a bias to driving transistors of the plurality of pixels PX at the second frequency FF2 that is the fixed frequency. In an exemplary embodiment, in each frame period, the OLED display device 300 may substantially simultaneously perform the display scan operation and the self-scan operation once, and then may additionally perform the self-scan operation once or more.

For example, as illustrated in FIG. 15, in a case where the maximum frequency of the variable input frame frequency VIFF is about 120 Hz, even if the variable input frame frequency VIFF is changed, the OLED display device 300 may perform the self-scan operation at the fixed second frequency FF2 of about 240 Hz. Further, in a case where the variable input frame frequency VIFF is about 120 Hz, as illustrated as 510 of FIG. 15, the OLED display device 300 may perform the display scan operation at the first frequency FF1 of about 120 Hz. Thus, in each frame period FP, the display scan operation may be performed once, and the self-scan operation may be performed twice. Further, in a case where the variable input frame frequency VIFF is about 80 Hz, as illustrated as 520 of FIG. 15, the OLED display device 300 may perform the display scan operation at the first frequency FF1 of about 80 Hz. Thus, in each frame period FP, the display scan operation may be performed once, and the self-scan operation may be performed three times. Further, in a case where the variable input frame frequency VIFF is about 60 Hz, as illustrated as 530 of FIG. 15, the OLED display device 300 may perform the display scan operation at the first frequency FF1 of about 60 Hz. Thus, in each frame period FP, the display scan operation may be performed once, and the self-scan operation may be performed four times. Further, in a case where the variable input frame frequency VIFF is about 48 Hz, as illustrated as 540 of FIG. 15, the OLED display device 300 may perform the display scan operation at the first frequency FF1 of about 48 Hz. Thus, in each frame period FP, the display scan operation may be performed once, and the self-scan operation may be performed five times. Further, in a case where the variable input frame frequency VIFF is about 30 Hz, as illustrated as 550 of FIG. 15, the OLED display device 300 may perform the display scan operation at the first frequency FF1 of about 30 Hz. Thus, in each frame period FP, the display scan operation may be performed once, and the self-scan operation may be performed eight times. Further, in a case where the variable input frame frequency VIFF is about 24 Hz, as illustrated as 560 of FIG. 15, the OLED display device 300 may perform the display scan operation at the first frequency FF1 of about 24 Hz. Thus, in each frame period FP, the display scan operation may be performed once, and the self-scan operation may be performed ten times.

To perform the display scan operation at the first frequency FF1 that is the variable frequency and to perform the self-scan operation at the second frequency FF2, the controller 350 may provide the scan start pulse SCAN_SP and the gate writing start pulse GW_SP to the scan driver 330 at the first frequency FF1, may provide the gate initialization start pulse GI_SP to the scan driver 330 at the second frequency FF2, and may provide the first emission start pulse EM1_SP and the second emission start pulse EM2_SP to the emission driver 340 at the second frequency FF2. Further, a time length of each frame period FP may correspond to the first frequency FF1. Thus, in each frame period FP, the controller 350 may provide one scan start pulse SCAN_SP, one gate writing start pulse GW_SP and at least two gate initialization start pulses GI_SP to the scan driver 330, and may provide at least two first emission start pulses EM1_SP and at least two second emission start pulses EM2_SP to the emission driver 340.

For example, as illustrated in FIG. 16, in a case where the first frequency FF1 is about 120 Hz, and the second frequency FF2 is about 240 Hz, in each frame period FP, the controller 350 may provide one scan start pulse SCAN_SP, one gate writing start pulse GW_SP and two gate initialization start pulses GI_SP to the scan driver 330, and may provide two first emission start pulses EM1_SP and two second emission start pulses EM2_SP to the emission driver 340. Thus, in each frame period FP, the scan driver 330 may provide the scan signal SCAN to the plurality of pixels PX at the first frequency FF1 of about 120 Hz in response to the one scan start pulse SCAN_SP such that the scan signal SCAN is provided once to each pixel PX, may provide the gate writing signal GW to the plurality of pixels PX at the first frequency FF1 of about 120 Hz in response to the one gate writing start pulse GW_SP such that the gate writing signal GW is provided once to each pixel PX, and may provide the gate initialization signal GI to the plurality of pixels PX at the second frequency FF2 of about 240 Hz in response to the two gate initialization start pulses GI_SP such that the gate initialization signal GI is provided twice to each pixel PX. For example, the scan driver 330 may sequentially provide the gate initialization signal GI from a first row to a last row of the display panel 310 in response to a current gate initialization start pulse GI_SP, and the controller 350 may provide the next gate initialization start pulse GI_SP to the scan driver 330 at a time point when the scan driver 330 provides the gate initialization signal GI to a middle row of the display panel 310 in response to the current gate initialization start pulse GI_SP. Further, in each frame period FP, the emission driver 340 may provide the first emission signal EM1 to the plurality of pixels PX at the second frequency FF2 of about 240 Hz in response to the two first emission start pulses EM1_SP such that the first emission signal EM1 is provided twice to each pixel PX, and may provide the second emission signal EM2 to the plurality of pixels PX at the second frequency FF2 of about 240 Hz in response to the two second emission start pulses EM2_SP such that the second emission signal EM2 is provided twice to each pixel PX. For example, the emission driver 340 may sequentially provide the first and second emission signals EM1 and EM2 from the first row to the last row of the display panel 310 in response to current first and second emission start pulses EM1_SP and EM2_SP, and the controller 350 may provide the next first and second emission start pulses EM1_SP and EM2_SP to the emission driver 340 at a time point when the emission driver 340 provides the first and second emission signals EM1 and EM2 to the middle row of the display panel 310 in response to the current first and second emission start pulses EM1_SP and EM2_SP. Further, the controller 350 may provide, as the output image data ODAT, the frame data FD to the data driver 320 at the first frequency FF1 of about 120 Hz such that one frame data FD is provided in each frame period FP. Accordingly, the display scan operation may be performed at the first frequency FF1 of about 120 Hz, and the self-scan operation may be performed at the second frequency FF2 of about 240 Hz.

Further, as illustrated in FIG. 16, in a case where the first frequency FF1 is about 60 Hz, and the second frequency FF2 is about 240 Hz, in each frame period FP, the controller 350 may provide one scan start pulse SCAN_SP, one gate writing start pulse GW_SP and four gate initialization start pulses GI_SP to the scan driver 330, and may provide four first emission start pulses EM1_SP and four second emission start pulses EM2_SP to the emission driver 340. Thus, in each frame period FP, the scan driver 330 may provide the scan signal SCAN to the plurality of pixels PX at the first frequency FF1 of about 60 Hz in response to the one scan start pulse SCAN_SP such that the scan signal SCAN is provided once to each pixel PX, may provide the gate writing signal GW to the plurality of pixels PX at the first frequency FF1 of about 60 Hz in response to the one gate writing start pulse GW_SP such that the gate writing signal GW is provided once to each pixel PX, and may provide the gate initialization signal GI to the plurality of pixels PX at the second frequency FF2 of about 240 Hz in response to the four gate initialization start pulses GI_SP such that the gate initialization signal GI is provided four times to each pixel PX. Further, in each frame period FP, the emission driver 340 may provide the first emission signal EM1 to the plurality of pixels PX at the second frequency FF2 of about 240 Hz in response to the four first emission start pulses EM1_SP such that the first emission signal EM1 is provided four times to each pixel PX, and may provide the second emission signal EM2 to the plurality of pixels PX at the second frequency FF2 of about 240 Hz in response to the four second emission start pulses EM2_SP such that the second emission signal EM2 is provided four times to each pixel PX. Further, the controller 350 may provide, as the output image data ODAT, the frame data FD to the data driver 320 at the first frequency FF1 of about 60 Hz such that one frame data FD is provided in each frame period FP. Accordingly, the display scan operation may be performed at the first frequency FF1 of about 60 Hz, and the self-scan operation may be performed at the second frequency FF2 of about 240 Hz.

As described above, in the OLED display device 300 according to an exemplary embodiment, the self-scan frequency, or the second frequency FF2 may be the fixed frequency higher than the first frequency FF1. Accordingly, even if the first frequency FF1 that is the driving frequency of the display panel 310, or the display scan frequency is changed, the OLED display device 300 according to an exemplary embodiment may display an image with substantially constant luminance at the same gray level.

Although exemplary embodiments have been shown and described wherein the higher self-scan frequency is fixed and the potentially lower frequency frame rate is variable, embodiments are not limited thereto. For example, the higher self-scan frequency may be a minimum multiple of the variable frame rate to meet or exceed a threshold frequency.

Figure 17:
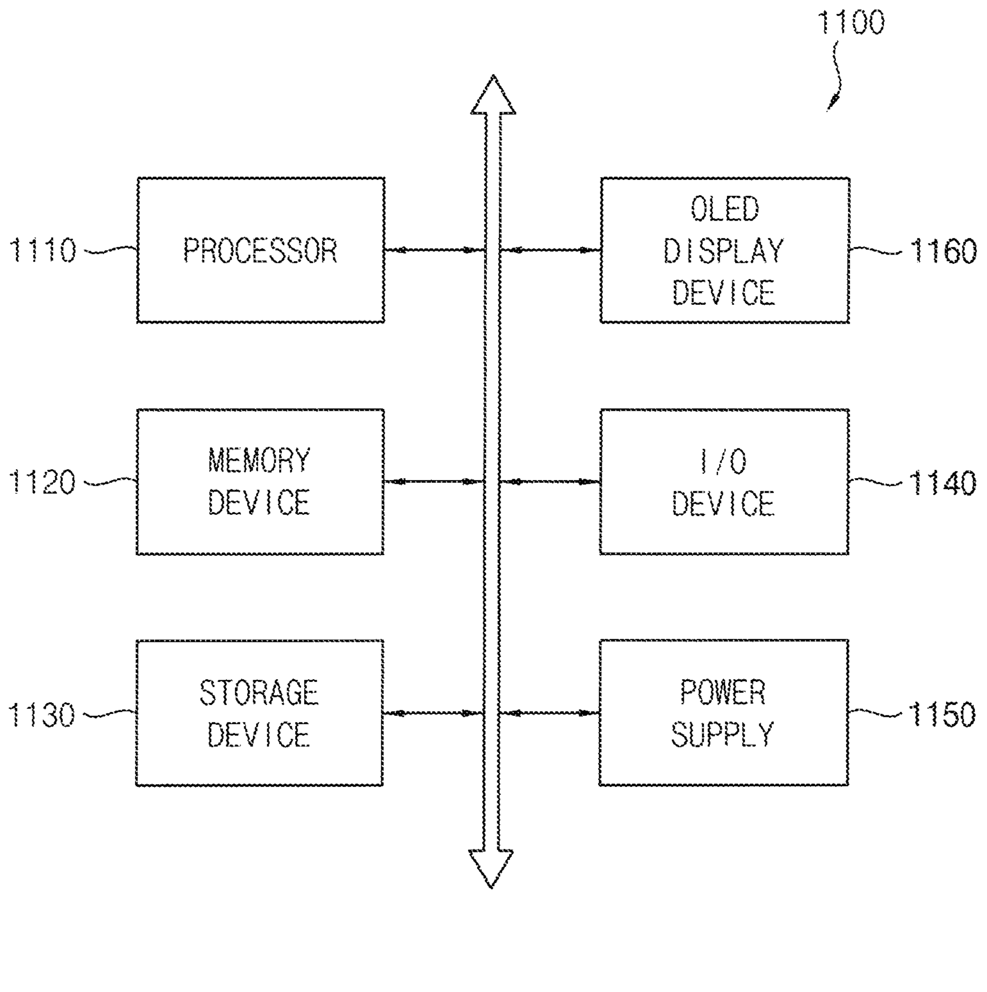
FIG. 17 is a block diagram illustrating an electronic device including an OLED display device according to an exemplary embodiment.

FIG. 17 illustrates an electronic device including an OLED display device according to an exemplary embodiment.

Referring to FIG. 17, an electronic device 1100 may include a processor 1110, a memory device 1120, a storage device 1130, an input/output (I/O) device 1140, a power supply 1150, and an OLED display device 1160. The electronic device 1100 may further include a plurality of ports for communicating a video card, a sound card, a memory card, a universal serial bus (USB) device, other electric devices, or the like The processor 1110 may perform various computing functions or tasks. The processor 1110 may be an application processor (AP), a micro processor, a central processing unit (CPU), or the like The processor 1110 may be coupled to other components via an address bus, a control bus, a data bus, or the like Further, in An exemplary embodiment, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAIVI) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, or the like The storage device 1130 may be a solid-state drive (SSD) device, a hard disk drive (HDD) device, a CD-ROM device, or the like The I/O device 1140 may be an input device such as a keyboard, a keypad, a mouse, a touch screen, etc, and an output device such as a printer, a speaker, or the like The power supply 1150 may supply power for operations of the electronic device 1100. The OLED display device 1160 may be coupled to other components through the buses or other communication links.

The OLED display device 1160 may be substantially similar to the OLED display device 300 of FIG. 13, without limitation. In the OLED display device 1160, each pixel may include a capacitor, a first transistor, a second transistor including a gate receiving a gate writing signal, a third transistor including a gate receiving a scan signal, a fourth transistor including a gate receiving a gate initialization signal, a fifth transistor including a gate receiving a first emission signal, a sixth transistor including a gate receiving a second emission signal, and an OLED. The scan signal and the gate writing signal may be provided at a first frequency, and the first emission signal, the second emission signal and the gate initialization signal may be provided at a second frequency higher than the first frequency. Accordingly, a bias may be applied to the first transistor at the (fixed or constant) second frequency, and thus the OLED display device 1160 may display an image with substantially constant luminance at the same gray level even if the first frequency (e.g., a driving frequency or a display scan frequency) is changed.

The inventive concepts may be applied to any OLED display device 1160 supporting a variable frame mode, and any electronic device 1100 including the OLED display device 1160. For example, the inventive concepts may be applied to a smart phone, a wearable electronic device, a tablet computer, a mobile phone, a television (TV), a digital TV, a three-dimensional (3D) TV, a personal computer (PC), a home appliance, a laptop computer, a personal digital assistant (PDA), a portable multimedia player (PMP), a digital camera, a music player, a portable game console, a navigation device, or the like Although exemplary embodiments have been described, those of ordinary skill in the pertinent art may readily appreciate that many modifications are possible in the exemplary embodiments without materially departing from the teachings of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other embodiments, are intended to be included within the scope of the appended claims.

What is claimed is:

1. A pixel of a light-emitting display device, the pixel comprising:

a first transistor including a gate coupled to a gate node, a first terminal, and a second terminal;

a second transistor including a gate receiving a first signal, a first terminal coupled to a data line, and a second terminal coupled to the first terminal of the first transistor;

a third transistor including a gate receiving a second signal, a first terminal coupled to a line of an initialization voltage, and a second terminal coupled to an anode of a light-emitting diode; and a fourth transistor including a gate receiving a third signal, a first terminal coupled to the second terminal of the first transistor, and a second terminal coupled to the anode of the light-emitting diode, wherein a frequency of the first signal is different from a frequency of at least one of the second signal and the third signal.

2. The pixel of claim 1, wherein the first, second and third transistors are PMOS transistors, and wherein the fourth transistor is an NMOS transistor.

3. The pixel of claim 1, wherein the first, second, third and fourth transistors are PMOS transistors.

4. The pixel of claim 1, wherein the first signal is provided at a first frequency, and the second signal and the third signal are provided at a second frequency higher than the first frequency.

5. The pixel of claim 4, wherein the second frequency is a fixed frequency, and the first frequency is a variable frequency.

6. The pixel of claim 1, further comprising:

a capacitor including a first electrode coupled to a line of a first power supply voltage, and a second electrode coupled to the gate node;

a fifth transistor including a gate receiving a fourth signal, a first terminal coupled to the second terminal of the first transistor, and a second terminal coupled to the gate node; and a sixth transistor including a gate receiving a fifth signal, a first terminal coupled to the line of the first power supply voltage, and a second terminal coupled to the first terminal of the first transistor, wherein the light-emitting diode includes the anode, and a cathode coupled to a line of a second power supply voltage.

7. The pixel of claim 6, wherein the first signal and the fourth signal are provided at a first frequency, and the second signal, the third signal and the fifth signal are provided at a second frequency higher than the first frequency.

8. The pixel of claim 7, wherein the second frequency corresponds to a double of a maximum frequency of a variable input frame frequency of the light-emitting display device, and wherein the first frequency corresponds to the second frequency divided by N, where N is an integer greater than 1 and less than or equal to the maximum frequency.

9. A pixel of a light-emitting display device, the pixel comprising:

a first transistor including a gate coupled to a gate node, a first terminal, and a second terminal;

a second transistor including a gate receiving a first signal, a first terminal coupled to a data line, and a second terminal coupled to the first terminal of the first transistor;

a third transistor including a gate receiving a second signal, a first terminal coupled to the second terminal of the first transistor, and a second terminal coupled to the gate node; and a fourth transistor including a gate receiving a third signal, a first terminal coupled to the second terminal of the first transistor, and a second terminal coupled to an anode of a light-emitting diode, wherein a frequency of at least one of the first signal and the second signal is different from a frequency of the third signal, and wherein at least one of the first, second, third and fourth transistors is an NMOS transistor.

10. The pixel of claim 9, wherein the first and second transistors are PMOS transistors, and wherein the third and fourth transistors are the NMOS transistors.

11. The pixel of claim 9, wherein the first, second and fourth transistors are PMOS transistors, and wherein the third transistor is the NMOS transistor.

12. The pixel of claim 9, wherein the first signal and the second signal are provided at a first frequency, and the third signal is provided at a second frequency higher than the first frequency.

13. The pixel of claim 12, wherein the second frequency is a fixed frequency, and the first frequency is a variable frequency.

14. The pixel of claim 9, further comprising:

a fifth transistor including a gate receiving a fourth signal, a first terminal coupled to a line of an initialization voltage, and a second terminal coupled to the anode of the light-emitting diode.

15. The pixel of claim 14, further comprising:

a capacitor including a first electrode coupled to a line of a first power supply voltage, and a second electrode coupled to a gate node; and a sixth transistor including a gate receiving a fifth signal, a first terminal coupled to the line of the first power supply voltage, and a second terminal coupled to the first terminal of the first transistor, wherein the light-emitting diode includes the anode, and a cathode coupled to a line of a second power supply voltage.

16. The pixel of claim 15, wherein the first signal and the second signal are provided at a first frequency, and the third signal, the fourth signal and the fifth signal are provided at a second frequency higher than the first frequency.

17. The pixel of claim 16, wherein the second frequency corresponds to a double of a maximum frequency of a variable input frame frequency of the light-emitting display device, and wherein the first frequency corresponds to the second frequency divided by N, where N is an integer greater than 1 and less than or equal to the maximum frequency.

18. A pixel of a light-emitting display device, the pixel comprising:

a first transistor including a gate coupled to a gate node, a first terminal, and a second terminal;

a second transistor including a gate receiving a first signal, a first terminal coupled to a data line, and a second terminal coupled to the first terminal of the first transistor;

a third transistor including a gate receiving a second signal, a first terminal coupled to the second terminal of the first transistor, and a second terminal coupled to the gate node; and a fourth transistor including a gate receiving a third signal, a first terminal coupled to the second terminal of the first transistor, and a second terminal coupled to an anode of a light-emitting diode, wherein a frame period for the light-emitting display device includes a first sub-frame period and a second sub-frame period, wherein, in the first sub-frame period, the second, third and fourth transistors are turned on, wherein, in the second sub-frame period, the fourth transistor is turned on, and the second and third transistors are not turned on, and wherein at least one of the first, second, third and fourth transistors is an NMOS transistor.

19. The pixel of claim 18, further comprising:

a capacitor including a first electrode coupled to a line of a first power supply voltage, and a second electrode coupled to a gate node;

a fifth transistor including a gate receiving a fourth signal, a first terminal coupled to a line of an initialization voltage, and a second terminal coupled to the anode of the light-emitting diode; and a sixth transistor including a gate receiving a fifth signal, a first terminal coupled to the line of the first power supply voltage, and a second terminal coupled to the first terminal of the first transistor, wherein the light-emitting diode includes the anode, and a cathode coupled to a line of a second power supply voltage.

20. The pixel of claim 19, wherein, in the first sub-frame period, the second, third, fourth, fifth and sixth transistors are turned on, and wherein, in the second sub-frame period, the fourth, fifth and sixth transistors are turned on, and the second and third transistors are not turned on.

* * * * *